US012579941B2

(12) United States Patent
Wang et al.

(10) Patent No.: US 12,579,941 B2
(45) Date of Patent: Mar. 17, 2026

(54) PIXEL DRIVING CIRCUIT AND DISPLAY PANEL

(71) Applicant: BOE TECHNOLOGY GROUP CO., LTD., Beijing (CN)

(72) Inventors: Li Wang, Beijing (CN); Yu Feng, Beijing (CN); Hao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/089,049

(22) Filed: Mar. 25, 2025

(65) Prior Publication Data

US 2025/0225934 A1 Jul. 10, 2025

Related U.S. Application Data

(63) Continuation of application No. 17/914,844, filed as application No. PCT/CN2021/121824 on Sep. 29, 2021, now Pat. No. 12,300,167.

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0842* (2013.01); *G09G 2310/061* (2013.01); *G09G 2310/08* (2013.01); *G09G 2320/0247* (2013.01)

(58) Field of Classification Search
None
See application file for complete search history.

(56) References Cited

U.S. PATENT DOCUMENTS

2021/0193778 A1 6/2021 Wang et al.
2023/0042966 A1* 2/2023 Huangfu .............. G09G 3/3258
2024/0233635 A1* 7/2024 Wang .................. G09G 3/3233

FOREIGN PATENT DOCUMENTS

CN 105206221 A 12/2015
CN 105932068 A 9/2016
CN 106910468 A 6/2017
(Continued)

OTHER PUBLICATIONS

First Office Action of CN application No. 2021800027568 dated Jun. 25, 2025.
(Continued)

*Primary Examiner* — Parul H Gupta
(74) *Attorney, Agent, or Firm* — Calfee, Halter & Griswold LLP

(57) ABSTRACT

A pixel driving circuit and a display panel are provided, the circuit includes a driving transistor connected to a first and third nodes; a first transistor connected to a second node to output a data voltage to the second node in response to a first scan signal; a second transistor connected to the first and third nodes; a fifth transistor connected to the second node to output a reference voltage to the second node in response to a first reset signal; a seventh transistor connected to the third and fourth nodes to electrically communicate the third node with the fourth node in response to a light emitting control signal; and a storage capacitor, connected to the first and second nodes to store the data voltage and a threshold voltage of the driving transistor.

20 Claims, 15 Drawing Sheets

(56) References Cited

FOREIGN PATENT DOCUMENTS

| | | | |
|---|---|---|---|
| CN | 107146580 | A | 9/2017 |
| CN | 108806596 | A | 11/2018 |
| CN | 109671748 | A | 4/2019 |
| CN | 110675822 | A | 1/2020 |
| CN | 110910815 | A | 3/2020 |
| CN | 112424856 | A | 2/2021 |
| CN | 113160750 | A | 7/2021 |
| CN | 113299229 | A | 8/2021 |
| CN | 216353299 | U | 4/2022 |
| CN | 116547740 | A | 8/2023 |
| KR | 20100045578 | A | 5/2010 |
| WO | 2019019590 | A1 | 1/2019 |
| WO | 2021164699 | A1 | 8/2021 |

OTHER PUBLICATIONS

First Office Action of CN application No. 2023111413416 dated Aug. 19, 2025.

* cited by examiner

PIXEL DRIVING CIRCUIT AND DISPLAY PANEL

CROSS-REFERENCE

The present application is a Continuation of U.S. application Ser. No. 17/914,844, filed on Sep. 27, 2022, which is a U.S. National Stage of International Application No. PCT/CN2021/121824, filed on Sep. 29, 2021, the entire content of which is incorporated herein by reference for all purposes. No new matter has been introduced.

TECHNICAL FIELD

The present disclosure relates to a field of display technology, and more particularly to a pixel driving circuit and a display panel.

BACKGROUND

Electroluminescent devices, such as organic light emitting diodes, have been widely used in a display field. The display device may be provided with a pixel driving circuit that drives the electroluminescent device to emit light, and the pixel driving circuit generally includes a driving transistor for generating a driving current. In order to improve display effect, a threshold voltage of the driving transistor may be compensated in some pixel driving circuits to overcome display difference caused by difference of the threshold voltages of different driving transistors.

However, in the prior art, the pixel driving circuit usually compensates the threshold voltage of the driving transistor first, and then writes a data voltage to the pixel driving circuit, which leads to a relatively complicated driving process of the pixel driving circuit.

SUMMARY

The present disclosure aims to overcome shortcomings of the above-mentioned prior art, and provides a pixel driving circuit, and a display panel, to simplify the pixel driving method.

According to a first aspect of the present disclosure, a pixel driving circuit is provided and includes

- a driving transistor, connected to a first node and a third node;
- a first transistor, connected to a second node, configured to output a data voltage to the second node in response to a first scan signal;
- a second transistor, connected to the first node and the third node;
- a fifth transistor, connected to the second node, configured to output a reference voltage to the second node in response to a first reset signal;
- a seventh transistor, connected to the third node and a fourth node, configured to electrically communicate the third node with the fourth node in response to a light emitting control signal; and
- a storage capacitor, connected to the first node and the second node, where the storage capacitor is configured to store the data voltage and a threshold voltage of the driving transistor.

In some embodiments, the pixel driving circuit further includes a fourth transistor, where a first electrode of the fourth transistor is configured to load an initialization voltage, and a second electrode of the fourth transistor is connected to the first node.

In some embodiments, a channel region of the fifth transistor includes a first sub-channel region and a second sub-channel region, and a conductive second conductive lead connecting the first sub-channel region and the second sub-channel region in series; the first sub-channel region and the second sub-channel region are arranged in a row direction.

In some embodiments, the pixel driving circuit further includes an eighth transistor, where a first electrode of the eighth transistor is configured to load an initialization voltage, and a second electrode of the eighth transistor is connected to the fourth node.

In some embodiments, a display panel is provided with a first reset lead;

- where the first reset lead overlaps with a channel region of the eighth transistor, such that an overlapping part is reused as a gate of the eighth transistor.

In some embodiments, materials of active layers of the first transistor, the driving transistor, the fifth transistor, the seventh transistor, and the eighth transistor are all polysilicon semiconductor materials.

In some embodiments, the storage capacitor includes a first electrode plate and a second electrode plate, the first electrode plate is located in a first gate layer of a display panel, and the second electrode plate is located in a second gate layer of the display panel; and

- the second electrode plates adjacently arranged along a row direction are independently provided.

In some embodiments, the display panel is provided with a second gate layer, where the second gate layer is provided with a power distribution lead extending along the row direction, and the power distribution lead is electrically connected to at least one first power supply voltage lead of the display panel.

In some embodiments, the display panel is provided with a second metal wiring layer, where the second metal wiring layer is provided with a first power supply voltage lead, a data lead, and a transfer metal structure, and a pixel electrode of a light-emitting element is connected to the transfer metal structure through a via hole.

In some embodiments, the display panel includes a base substrate, a driving circuit layer, and a pixel layer sequentially stacked;

- where the pixel driving circuit is provided in the driving circuit layer;
- the pixel layer includes a red light emitting element, a green light emitting element, and a blue light emitting element; and
- a pixel electrode of a light-emitting element is electrically connected to the pixel driving circuit.

In some embodiments, during a threshold voltage compensation phase, the first node is charged to VDD+Vth; the VDD is a first power supply voltage, and the Vth is the threshold voltage of the driving transistor.

In some embodiments, the pixel driving circuit is applied to a display panel, and the display panel includes a base substrate;

- where the storage capacitor further includes a third electrode plate and a fourth electrode plate, and the first electrode plate, the second electrode plate, the third electrode plate and the fourth electrode plate are sequentially stacked on a side of the base substrate;
- the display panel further includes a first passivation layer and a first planarization layer sequentially stacked on a side of the third electrode plate away from the base substrate, and the fourth electrode plate is arranged on a side of the first planarization layer away from the base substrate;

the first planarization layer includes at least a first portion and a second portion, and the first portion of the first planarization layer is sandwiched between the third electrode plate and the fourth electrode plate; the second portion of the first planarization layer does not overlap with the third electrode plate and the fourth electrode plate; and a thickness of the first portion is less than a thickness of the second portion.

In some embodiments, the thickness of the first portion of the first planarization layer is 0 to expose the first passivation layer.

In some embodiments, the first planarization layer includes a third portion sandwiched between the first portion and the second portion, an inner edge of the third portion is located within an overlapping region of the third electrode plate and the fourth electrode plate, and an outer edge of the third portion does not overlap with any one of the third electrode plate and the fourth electrode plate.

In some embodiments, the pixel driving circuit is applied to a display panel, and a display panel is provided with a first reset lead;

where the first reset lead overlaps with a channel region of the fifth transistor, such that an overlapping part is reused as a gate of the fifth transistor.

In some embodiments, orthographic projections of the first sub-channel region and the second sub-channel region on a base substrate of the display panel are located within an orthographic projection of the first reset lead on the base substrate.

In some embodiments, the first electrode plate covers a channel region of the driving transistor to be reused as a gate of the driving transistor.

In some embodiments, the first electrode plate is provided with a thirteenth bottom via hole region, and the thirteenth bottom via hole region is electrically connected to the third electrode plate through a via hole.

In some embodiments, the pixel driving circuit is applied to a display panel, and the display panel includes a first gate layer;

a gate of the second transistor includes a first gate located at the first gate layer, the first gate layer is provided with a second scan lead configured to load a second scan signal, and the second scan lead is electrically connected to the first gate of the second transistor, such that the second scan signal is loaded to the first gate of the second transistor.

In some embodiments, the second scan lead extends along a row direction such that each pixel driving circuit provided in a same row may share a same second scan lead.

According to a second aspect of the present disclosure, a display panel is provided and includes: a pixel driving circuit, and the pixel driving circuit includes:

a driving transistor, connected to a first node and a third node;

a first transistor, connected to a second node, configured to output a data voltage to the second node in response to a first scan signal;

a second transistor, connected to the first node and the third node;

a fifth transistor, connected to the second node, configured to output a reference voltage to the second node in response to a first reset signal;

a seventh transistor, connected to the third node and a fourth node, configured to electrically communicate the third node with the fourth node in response to a light emitting control signal; and a storage capacitor, connected to the first node and the second node, where the storage capacitor is configured to store the data voltage and a threshold voltage of the driving transistor.

It is to be understood that the preceding general description and the following detailed description are exemplary and explanatory only and are not restrictive of the present disclosure.

BRIEF DESCRIPTION OF THE DRAWINGS

The accompanying drawings here are incorporated in the specification and constitute a part of this specification, show embodiments in accordance with the present disclosure and serve to explain the principles of the present disclosure together with the specification. Obviously, the drawings in the following description are only some embodiments of the present disclosure, and for those ordinary skills in the art, other drawings can also be obtained from these drawings without creative efforts.

DETAILED DESCRIPTION

Figure 1:
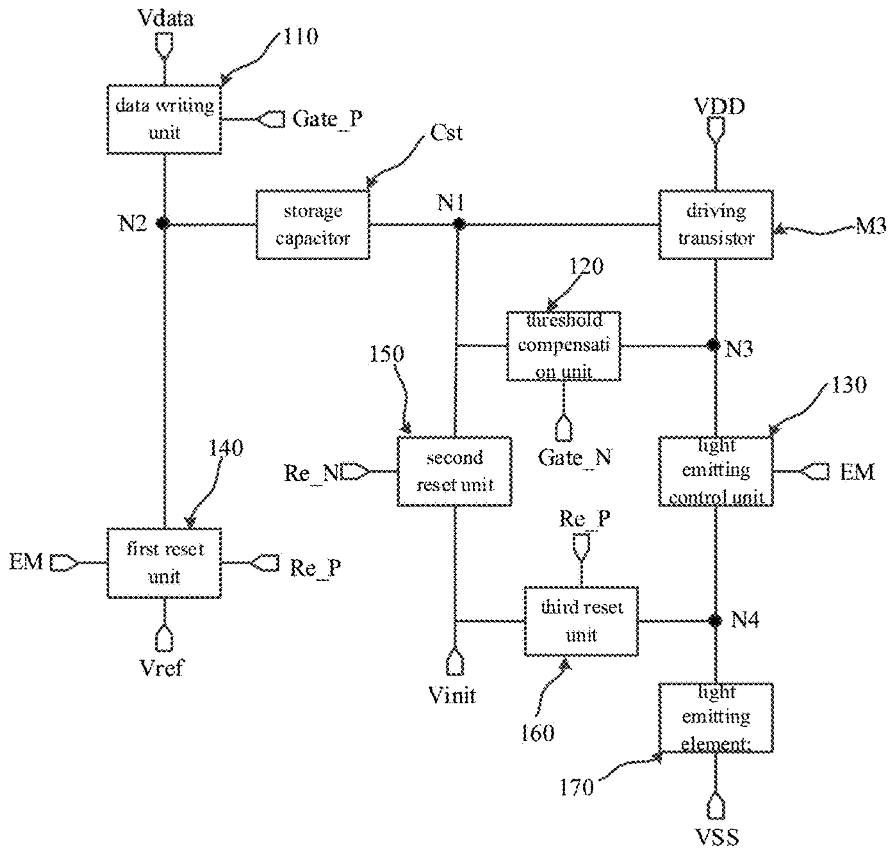
FIG. 1 is a schematic structural view of a pixel driving circuit according to an embodiment of the present disclosure.

Example embodiments will now be described more fully with reference to the accompanying drawings. However, the example embodiments may be implemented in a variety of forms, and should not be understood as being limited to the examples set forth herein. On the contrary, providing these embodiments makes the present disclosure more comprehensive and complete, and comprehensively communicates the concept of the example embodiments to those skilled in the art. The same reference numerals in the drawings denote the same or similar structures, and thus repeated descriptions thereof will be omitted.

Terms "one", "a/an" "the", "said" and "at least one" are used to denote the presence of one or a plurality of elements/components/etc. Terms "including" and "having" are used to denote the meaning of non-exclusive inclusion and refer to that there may be other elements/components/etc. in addition to the listed elements/components/etc. Terms "first", "second" and "third" are used herein only as markers, and not as restrictions on the number of objects.

In a display panel or a pixel driving circuit of the present disclosure, two structures overlap each other, which means the two structures are arranged to be stacked and intersected. That is, the two structures are located on different film layers of the display panel, and orthogonal projections of the two structures on the base substrate have an overlap region.

In the present disclosure, a transistor refers to an element having at least three terminals of a gate, a drain, and a source. The transistor has a channel region between a drain (a drain terminal, a drain region, or a drain electrode) and a source (a source terminal, a source region, or a source electrode), and a current may flow through the drain, the channel region, and the source. The channel region refers to a region through which the current mainly flows.

In the present disclosure, one of the drain and the source of the transistor serves as a first electrode of the transistor, and the other serves as a second electrode of the transistor. Functions of a "source" and a "drain" are sometimes interchanged with each other when a transistor of opposite polarity is used or when the direction of current flow is changed in circuit operation. Thus, in the present disclosure, in some cases, the first electrode may serve as a source and the second electrode may serve as a drain, while in other cases, the first electrode may serve as a drain and the second electrode may serve as a source.

In the present disclosure, unless otherwise specified, a via hole is a via hole in a conventional sense, and insulating film layers through which each via hole runs are not necessary to be the same or the conductive structures to which each via hole is connected are not necessary to be the same.

The present disclosure provides a pixel driving circuit and a display panel to which the pixel driving circuit is applied. Referring to FIG. 1, the pixel driving circuit provided by the present disclosure includes:

- a driving transistor M3 connected to a first node N1 and a third node N3, configured to output a driving current to the third node N3 under the control of the first node N1;
- a storage capacitor Cst connected to the first node N1 and a second node N2;
- a data writing unit 110 connected to the second node N2, configured to output a data voltage Vdata to the second node N2 in response to a first scan signal Gate_P;
- a light emitting control unit 130 connected to the third node N3 and a fourth node N4, configured to electrically communicate the third node N3 with the fourth node N4 in response to a light emitting control signal EM;
- a first reset unit 140 connected to the second node N2, configured to output a reference voltage Vref to the second node N2 in response to the light emitting control signal EM or a first reset signal Rc_P;
- a second reset unit 150 connected to the first node N1, configured to output an initialization voltage Vinit to the first node N1 in response to a second reset signal Re_N.

In an embodiment of the present disclosure, the pixel driving circuit may further include a threshold compensation unit 120. The threshold compensation unit 120, connected to the first node N1 and the third node N3, is configured to electrically communicate the first node N1 and the third node N3 in response to a second scan signal Gate_N.

Figure 3:
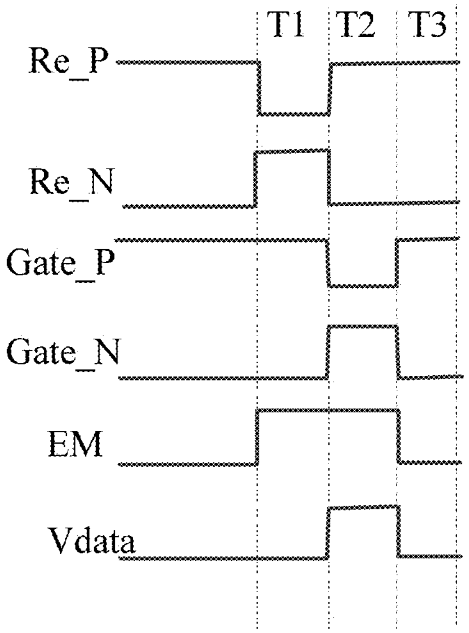
FIG. 3 is a driving timing chart of a pixel driving circuit according to an embodiment of the present disclosure.
Figure 24:
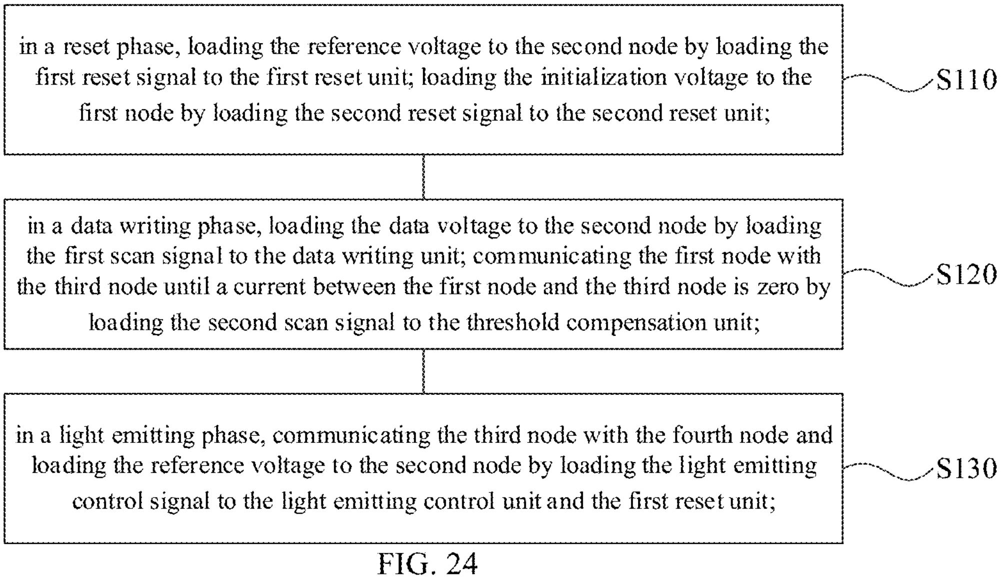
FIG. 24 is a flowchart of a pixel driving method according to an embodiment of the present disclosure.

Referring to FIG. 1, FIG. 3 and FIG. 24, the pixel driving circuit provided by the present disclosure may be driven by a pixel driving method as follows:

- step S110: in a reset phase T1, loading the reference voltage Vref to the second node N2 by loading the first reset signal Re_P to the first reset unit 140; loading the initialization voltage Vinit to the first node N1 by loading the second reset signal Re_N to the second reset unit 150;

step S120: in a data writing phase T2, loading the data voltage Vdata to the second node N2 by loading the first scan signal Gate_P to the data writing unit 110; communicating the first node N1 with the third node N2 until a current between the first node N1 and the third node N3 is zero by loading the second scan signal Gate_N to the threshold compensation unit 120, such that a threshold voltage of the driving transistor is written into the first node N1 to achieve compensation for the threshold voltage of the driving transistor;

step S130: in a light emitting phase T3, communicating the third node N3 with the fourth node N4 and loading the reference voltage EM to the second node N2 by loading the light emitting control signal 130 to the light emitting control unit 130 and the first reset unit 140.

It may be understood that in a timing chart shown in FIG. 3, the first reset signal Re_P, the first scan signal Gate_P, and the light emitting control signal EM are a valid signal at a low level and an invalid base value signal at a high level. The second reset signal Re_N and the second scan signal Gate_N are a valid signal at a high level and an invalid base value signal at a low level. It may be understood that the high level and low level of the valid signals in these signals may also be inverted, as long as the control of a corresponding unit may be achieved.

In the pixel driving circuit and the driving method thereof provided by the present disclosure, in the reset phase, different reset signals may be used to control the first reset unit 140 and the second reset unit 150, respectively, so as to reset the second node N2 with the reference voltage Vref and reset the first node N1 with the initialization voltage Vinit. The reference voltage Vref is a positive voltage, which may be 3V, and the initialization voltage Vinit is a negative voltage, which may be −3~−5V. In the data writing phase, the data voltage and the threshold voltage of the driving transistor may be written to two ends of the storage capacitor respectively. The first node N1 is charged to the voltage VDD+Vth, and the second node N2 is written with the data voltage Vdata, such that two processes of the data writing and threshold voltage compensation of the driving transistor are achieved in a same phase, thereby simplifying the driving method of the pixel driving circuit. In the light emitting phase, the first reset unit 140 may be controlled by the light emitting control signal EM to reset the second node N2, a voltage of the second node N2 changes from Vdata to Vref, the two ends of the capacitor follow the principle of charge conservation, and a voltage of the first node N1 jumps to VDD+Vth+Vref−Vdata to achieve pull-down (or pull-up) of a node voltage of the first node N1, such that the driving transistor M3 may generate the driving current to drive the light emitting element 170 to emit light.

Hereinafter, in conjunction with the drawings, the structure, principles, and effect of the pixel driving circuit provided by the present disclosure will be further explained and described.

Figure 23:
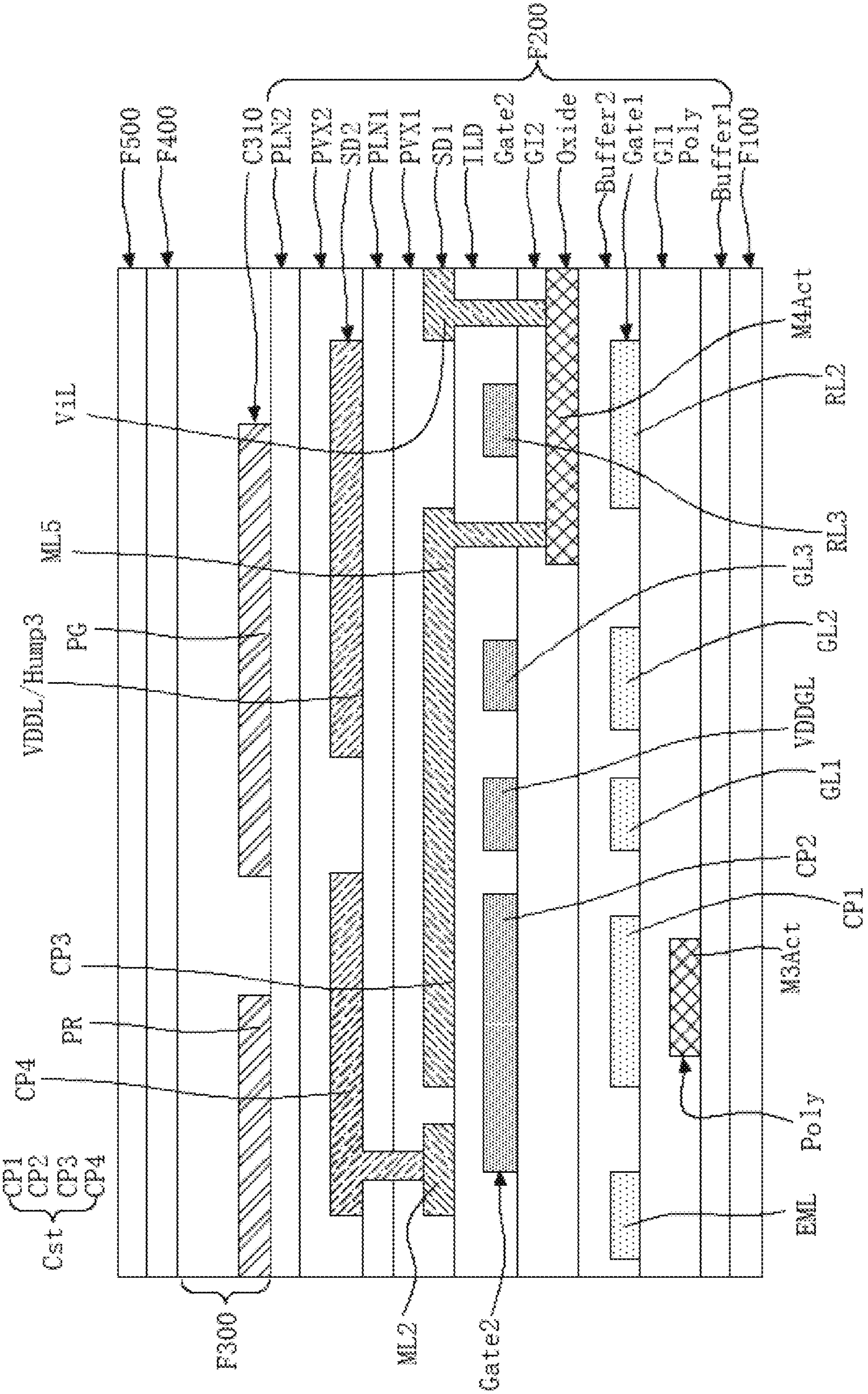
FIG. 23 is a cross-sectional structural view of a display panel taken along a dotted line PQ shown in FIG. 12 in an embodiment of the present disclosure.

Referring to FIG. 23, the display panel provided by the present disclosure may include a base substrate F100, a driving circuit layer F200, and a pixel layer F300 that are sequentially stacked. The pixel driving circuit provided by the present disclosure may be arranged in the driving circuit layer F200, and the pixel layer F300 may be provided with a light emitting element 170 corresponding to the pixel driving circuit. An end of the light emitting element 170 may be loaded with the second power supply voltage VSS, and the other end may be electrically connected to a fourth node of the pixel driving circuit. Thus, the pixel driving circuit may drive a corresponding light emitting element 170 to emit light.

Referring to FIG. 1, in an embodiment of the present disclosure, the pixel driving circuit further includes a third reset unit 160, which is connected to the fourth node N4 and is configured to output the initialization voltage Vinit to the fourth node N4 in response to the first reset signal Re_P. Thus, in the reset phase, the pixel driving circuit may reset the first node N1, the second node N2 and the fourth node N4 at the same time, which may quickly eliminate a voltage difference between a cathode and an anode of the light emitting element 170, and avoid a smear caused by the light emitting element 170 failing to stop emitting light in time.

Figure 2:
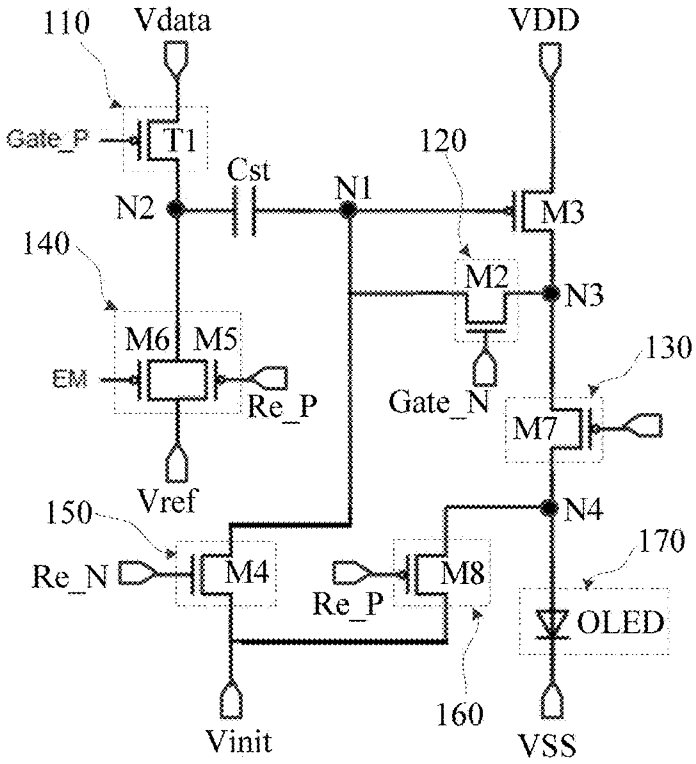
FIG. 2 is a schematic structural view of a pixel driving circuit according to an embodiment of the present disclosure.

Optionally, referring to FIG. 2, the threshold compensation unit 120 includes a second transistor M2, the second transistor M2 includes a first electrode connected to the third node N3, a second electrode connected to the first node N1 and a gate configured to load the second scan signal Gate_N. Material of an active layer of the second transistor M2 is a metal oxide semiconductor material. Thus, the second transistor M2 is a metal oxide transistor (Oxide-TFT) with a low leakage current in a turn-off state. Thus, the leakage current of the first node N1 may be reduced, which is beneficial for a potential maintenance of the storage capacitor Cst in the light emitting phase, and further reduces a flicker risk of the light emitting element 170 when the light emitting element 170 is driven at a low frequency. In an embodiment of the present disclosure, the second transistor M2 is an N-type thin film transistor.

Further optionally, a gate of the second transistor M2 includes a first gate and a second gate both configured to load the second scan signal Gate_N, and the active layer of the second transistor M2 includes a channel region; the first gate, the channel region, and the second gate of the second transistor are sequentially stacked. Thus, the channel region of the second transistor M2 is sandwiched between the first gate and the second gate, which may reduce the influence of the floating body effect on the second transistor M2 and further reduce the leakage current of the second transistor M2 in the turn-off state.

In an embodiment of the present disclosure, the pixel driving circuit is arranged on a side of a base substrate F100; the first gate of the second transistor M2 is located on a side of the channel region of the second transistor M2 close to the base substrate F100; an orthographic projection of the second gate of the second transistor M2 on the base substrate F100 is located within an orthographic projection of the first gate of the second transistor M2 on the base substrate F100. In other words, the first gate of the second transistor M2, the channel region of the second transistor M2, and the second gate of the second transistor M2 are sequentially stacked on a side of the base substrate F100; a part where the active layer of the second transistor M2 overlaps with the second gate of the second transistor M2 serves as the channel region of the second transistor M2, and the channel region of the second transistor M2 is completely blocked by the first gate of the second transistor M2. In this way, the first gate of the second transistor M2 may shield the influence of external light on the channel region of the second transistor M2, and avoid a photo-generated current generated by the channel region of the second transistor M2 from increasing a leakage current of the second transistor M2 in the turn-off state.

Optionally, referring to FIG. 3, the second reset unit 150 includes a fourth transistor M4, the fourth transistor M4 includes a first electrode configured to load the initialization voltage Vinit, a second electrode connected to the first node N1, and a gate configured to load the second reset signal Re_N. Material of an active layer of the fourth transistor is a metal oxide semiconductor material. Thus, the fourth transistor M4 is a metal oxide transistor with a low leakage current in the turn-off state. Thus, the leakage current of the first node N1 may be reduced, which is beneficial for a potential maintenance of the storage capacitor Cst in the light emitting phase, and further reduces a flicker risk of the light emitting element 170 when the light emitting element 170 is driven at a low frequency. In an embodiment of the present disclosure, the fourth transistor M4 is an N-type thin film transistor.

Further optionally, the gate of the fourth transistor M4 includes a first gate and a second gate both configured to load the second reset signal Re_N, and the active layer of the fourth transistor includes a channel region; the first gate, the channel region, and the second gate of the fourth transistor are sequentially stacked. Thus, the channel region of the fourth transistor M4 is sandwiched between the first gate and the second gate, which may reduce the influence of the floating body effect on the fourth transistor M4 and further reduce the leakage current of the fourth transistor M4 in the turn-off state.

In an embodiment of the present disclosure, the pixel driving circuit is provided on a side of the base substrate F100. The first gate of the fourth transistor M4 is located on a side of the channel region of the fourth transistor M4 close to the base substrate F100; an orthographic projection of the second gate of the fourth transistor M4 on the base substrate F100 is completely located within an orthographic projection of the first gate of the fourth transistor M4 on the base substrate F100.

In other words, the first gate of the fourth transistor M4, the channel region of the fourth transistor M4, and the second gate of the fourth transistor M4 are sequentially stacked on a side of the base substrate F100; a part where the active layer of the fourth transistor M4 overlaps with the second gate of the fourth transistor M4 serves as the channel region of the fourth transistor M4, and the channel region of the fourth transistor M4 is completely blocked by the first gate of the fourth transistor M4. In this way, the first gate of the fourth transistor M4 may shield the influence of external light on the channel region of the fourth transistor M4, and avoid a photo-generated current generated by the channel region of the fourth transistor M4 from increasing a leakage current of the fourth transistor M4 in the turn-off state.

Optionally, the pixel driving circuit is arranged on a side of the base substrate F100; the storage capacitor Cst includes at least two electrode plates that are overlapped and insulated from each other, and an insulating medium is filled between the two electrode plates. At least one electrode plate may be electrically connected to the first node N1, and at least one electrode plate may be electrically connected to the second node N2.

Optionally, referring to FIG. 23, the storage capacitor Cst includes a first electrode plate CP1, a second electrode plate CP2, a third electrode plate CP3 and a fourth electrode plate CP4 sequentially stacked on the side of the base substrate F100, and an insulating medium is sandwiched between any two adjacent electrode plates; the first electrode plate CP1 and the third electrode plate CP3 are both electrically connected to the first node N1; the second electrode plate CP2 and the fourth electrode plate CP4 are both connected to the second node N2. In this embodiment, a capacitance value of the storage capacitor Cst may be increased by increasing the number of electrode plates of the storage capacitor Cst, thereby reducing the influence of the leakage of the first node N1 on an electromotive force at the first node N1, reducing or eliminating the flicker problem of the pixel driving circuit under low frequency driving, and improving the display quality of the display panel to which the pixel driving circuit is applied.

Optionally, referring to FIG. 23, the display panel to which the pixel driving circuit is applied further includes a first passivation layer PVX1 and a first planarization layer PLN1 sequentially stacked on a side of the third electrode plate CP3 away from the base substrate F100, and the fourth electrode plate CP4 is arranged on a side of the first planarization layer PLN1 away from the base substrate F100.

Figure 19:
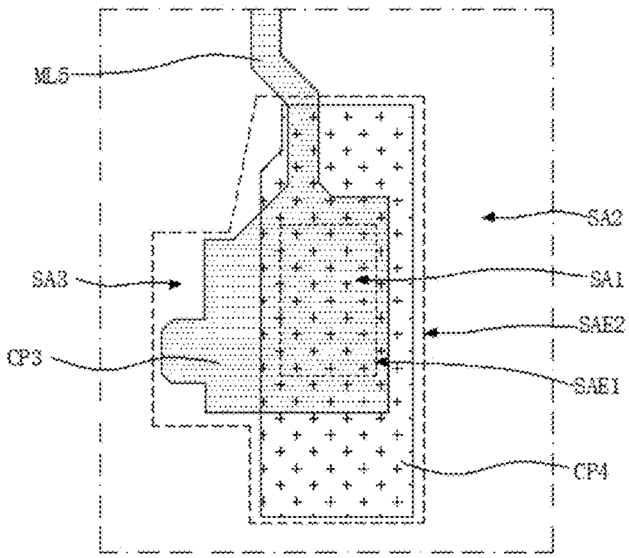
FIG. 19 is a schematic structural view of a third electrode plate and a fourth electrode plate that are stacked, of a pixel driving circuit according to an embodiment of the present disclosure.

Referring to FIG. 19, the first planarization layer PLN1 includes at least a first portion SA1 and a second portion SA2, and the first portion SA1 of the first planarization layer PLN1 is sandwiched between the third electrode plate CP3 and the fourth electrode plate CP4; the second portion SA2 of the first planarization layer PLN1 does not overlap with the third electrode plate CP3 and the fourth electrode plate CP4; and a thickness of the first portion SA1 is less than a thickness of the second portion SA2. In other words, the display panel may reduce a distance between the third electrode plate CP3 and the fourth electrode plate CP4 at the first portion SA1 of the first planarization layer PLN1 by thinning the first portion SA1 of the first planarization layer PLN1, thereby increasing the capacitance of the storage capacitor Cst.

Further optionally, the first planarization layer PLN1 may further include a third portion SA3 sandwiched between the first portion SA1 and the second portion SA2. An inner edge SAE1 of the third portion SA3 may be completely located within an overlapping region of the third electrode plate CP3 and the fourth electrode plate CP4, and an outer edge SAE2 of the third portion SA3 may not overlap with any one of the third electrode plate CP3 and the fourth electrode plate CP4. The third portion SA3 of the first planarization layer PLN1 may have a uniform thickness, for example, the thickness of the third portion SA3 may be the same as that of the first portion SA1 or the same as that of the second portion SA2, or the third portion SA3 of the first planarization layer PLN1 may have a non-uniform thickness, for example, a part of the third portion SA3 have the same thickness as the first portion SA1 and the rest part of the third portion SA3 have the same thickness as the second portion SA2. It may be understood that the thickness of the third portion SA3 of the first planarization layer PLN1 may also be in other states, for example, it may be in a graded state, or in a stepped state with multiple sudden changes, or in other regular or irregular states.

In an embodiment of the present disclosure, the thickness of the third portion SA3 of the first planarization layer PLN1 may be the same as that of the first portion SA1. Thus, the first portion SA1 and the third portion SA3 of the first planarization layer PLN1 are both thinned (both are thinned regions), such that a distance between the third electrode plate CP3 and the fourth electrode plate CP4 at any position of the overlapping region is reduced, and the capacitance value of the storage capacitor Cst may be increased to the maximum extent. In addition, since the second portion SA2 that is not thinned does not overlap with the third electrode plate CP3 and the fourth electrode plate CP4, and that is, a boundary of the thinned region of the first planarization layer PLN1 (i.e., the outer edge SAE2 of the third portion SA3) is located outside the overlapping region of the third electrode plate CP3 and the fourth electrode plate CP4, which may avoid the boundary of the thinned region of the first planarization layer PLN1 from being partially located in the overlapping region of the third electrode plate CP3 and the fourth electrode plate CP4, thereby avoiding an overlap area deviation between the overlapping region, of the third electrode plate CP3 and the fourth electrode plate CP4, and the thinned region caused by the process error, and further avoiding the change of the capacitance value of the storage capacitor Cst caused by this deviation, which may ensure the uniformity of the storage capacitance value of the storage capacitor Cst of different driving circuits.

In another embodiment of the present disclosure, the thickness of the third portion SA3 of the first planarization layer PLN1 may be the same as that of the second portion SA2. Thus, the second portion SA2 and the third portion SA3 of the first planarization layer PLN1 are not thinned, and the first portion SA1 of the first planarization layer PLN1 is thinned (a thinned region). Since the first portion SA1 that is thinned overlaps with the third electrode plate CP3 and the fourth electrode plate CP4, and that is, a boundary of the thinned region of the first planarization layer PLN1 (i.e., the inner edge SAE1 of the third portion SA3) is completely located within the overlapping region of the third electrode plate CP3 and the fourth electrode plate CP4, which may avoid the boundary of the thinned region of the first planarization layer PLN1 from being only partially located in the overlapping region of the third electrode plate CP3 and the fourth electrode plate CP4, thereby avoiding an overlap area deviation between the overlapping region, of the third electrode plate CP3 and the fourth electrode plate CP4, and the thinned region caused by the process error, and further avoiding the change of the capacitance value of the storage capacitor Cst caused by this deviation, which may ensure the uniformity of the storage capacitance value of the storage capacitor Cst of different driving circuits.

In an embodiment of the present disclosure, the thickness of the first portion SA1 of the first planarization layer PLN1 may be zero to expose the first passivation layer PVX1. Thus, the first planarization layer PLN1 may be hollow at a position of the first portion SA1 and expose the first passivation layer PVX1. The third electrode plate CP3 and the fourth electrode plate CP4 are separated by the first passivation layer PVX1 at the hollow position. In other words, the first passivation layer PVX1 is provided with a first portion SA1 sandwiched between the third electrode plate CP3 and the fourth electrode plate CP4, and the first planarization layer PLN1 has a hollow region exposing the first passivation layer PVX1, and the hollow region of the first planarization layer PLN1 exposes at least a part of the first portion SA1 of the first passivation layer PVX1. The hollow region is the thinned region of the first planarization layer PLN1. It may be understood that the third portion SA3 of the first planarization layer PLN1 may be not hollow at all, may be partially hollow, or may be completely hollow. Thus, the first portion SA1 of the passivation layer PVX1 may be partially located within the hollow region of the first planarization layer PLN1 or may be completely located within the hollow region of the first planarization layer PLN1.

Optionally, referring to FIG. 2, the driving transistor M3 includes a first electrode configured to load a first power supply voltage VDD, a second electrode connected to the third node N3 and a gate connected to the first node N1.

Optionally, referring to FIG. 2, the data writing unit 110 includes:

- a first transistor M1 including a first electrode configured to load the data voltage Vdata, a second electrode N2 connected to the second node, and a gate configured to load the first scan signal Gate_P.

Optionally, referring to FIG. 2, the light emitting control unit 130 includes:

- a seventh transistor M7 including a first electrode connected to the third node N3, a second electrode connected to the fourth node N4, and a gate configured to load the light emitting control signal EM;

Optionally, referring to FIG. 2, the first reset unit 140 includes a fifth transistor M5 and a sixth transistor M6.

The fifth transistor M5 includes a first electrode configured to load the reference voltage Vref, a gate configured to load the first reset signal Re_P, and a second electrode connected to the second node N2.

The sixth transistor M6 includes a first electrode configured to load the reference voltage Vref, a gate configured to load the light emitting control signal EM, and a second electrode connected to the second node N2.

Optionally, referring to FIG. 2, the third reset unit 160 includes:

- an eighth transistor M8 including a first electrode configured to load the initialization voltage Vinit, a gate configured to load the first reset signal Re_P, and a second electrode connected to the fourth node N4.

Optionally, materials of the active layers of the first transistor M1, the driving transistor M3, the fifth transistor M5, the sixth transistor M6, the seventh transistor M7, and the eighth transistor M8 are all polysilicon semiconductor materials, such as low-temperature polysilicon semiconductor materials. Further, the first transistor M1, the driving transistor M3, the fifth transistor M5, the sixth transistor M6, the seventh transistor M7, and the eighth transistor M8 are P-type thin film transistors.

Figure 18:
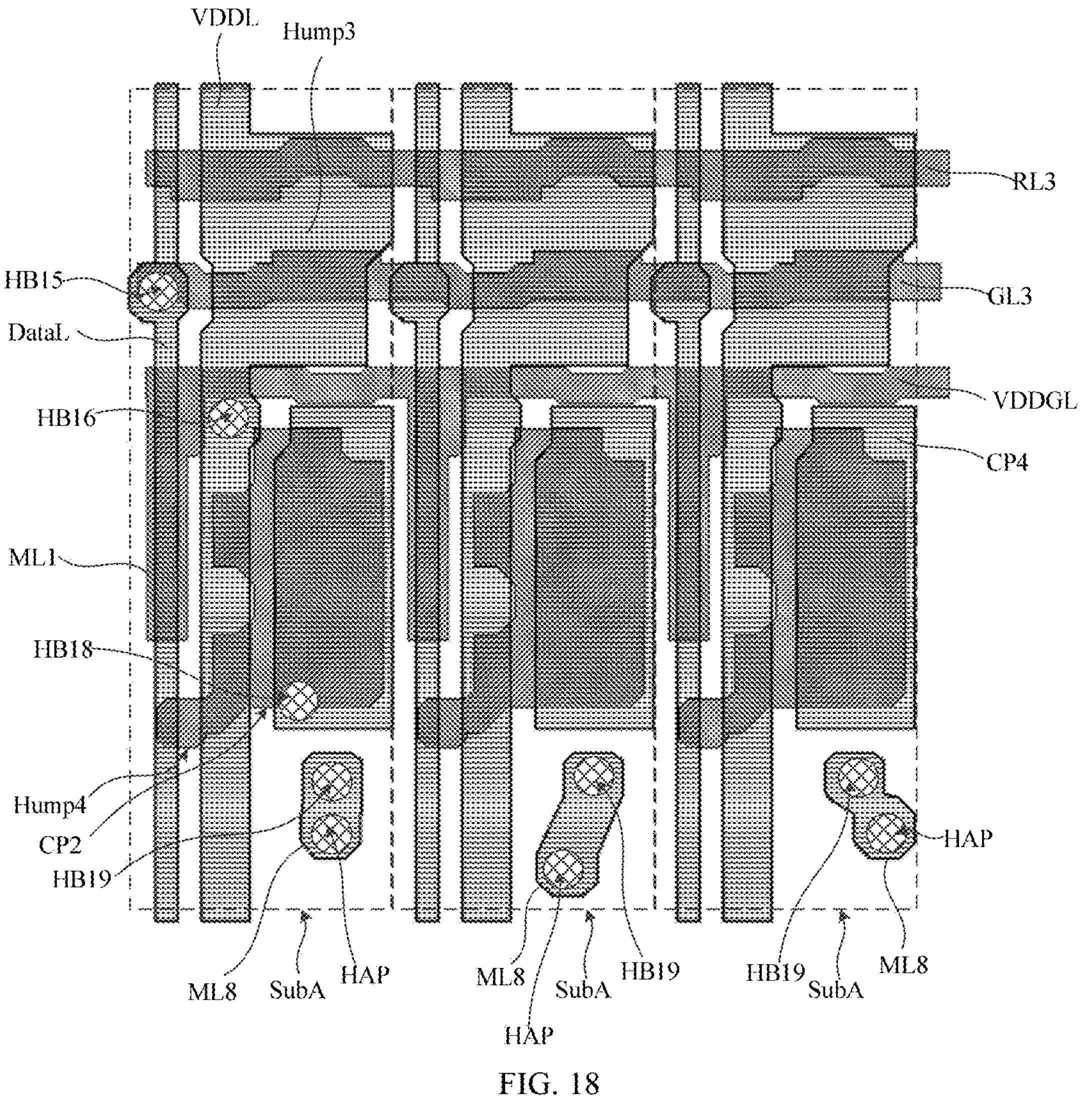
FIG. 18 is a schematic structural view of a second gate layer and a second metal wiring layer that are stacked, of a display panel according to an embodiment of the present disclosure.

Optionally, referring to FIG. 18, the display panel includes a data lead DataL and a first power supply voltage lead VDDL extending along a column direction H2. The data lead DataL is electrically connected to the first electrode of the first transistor M1, and the first power supply voltage lead VDDL is electrically connected to the first electrode of the driving transistor M3.

Referring to FIG. 18, the pixel driving circuit includes a first metal wiring structure ML1 electrically connected to the first power supply voltage lead VDDL and insulated from the data lead DataL. Thus, when the pixel driving circuit operates, the first metal wiring structure ML1 is loaded with the first power supply voltage VDD with a constant voltage. An orthographic projection of the data lead DataL on the base substrate F100 at least partially overlaps with an orthographic projection of the first metal wiring structure ML1 on the base substrate F100. Thus, a parasitic capacitance may be formed between the first metal wiring structure ML1 and the data lead DataL, thereby increasing a capacitance value of the parasitic capacitance of the data lead DataL. When the display panel is provided with a DEMUX (DE-Multiplexer) to drive a plurality of columns of pixel driving circuits, the data voltage Vdata of each column of the pixel driving circuits is pre-stored in the parasitic capacitance of the data lead DataL, and is written into the storage capacitance Cst after the first transistor M1 is turned on. In the present disclosure, since the parasitic capacitance of the data lead DataL is increased, the charge capacity of the data lead DataL is large, and when the charge that forms the data voltage Vdata is stored, the proportion of lost charge is less, and the storage capacitor Cst has a stronger charging ability in the data writing phase, so as to improve a charging rate of the storage capacitor Cst.

Figure 17:
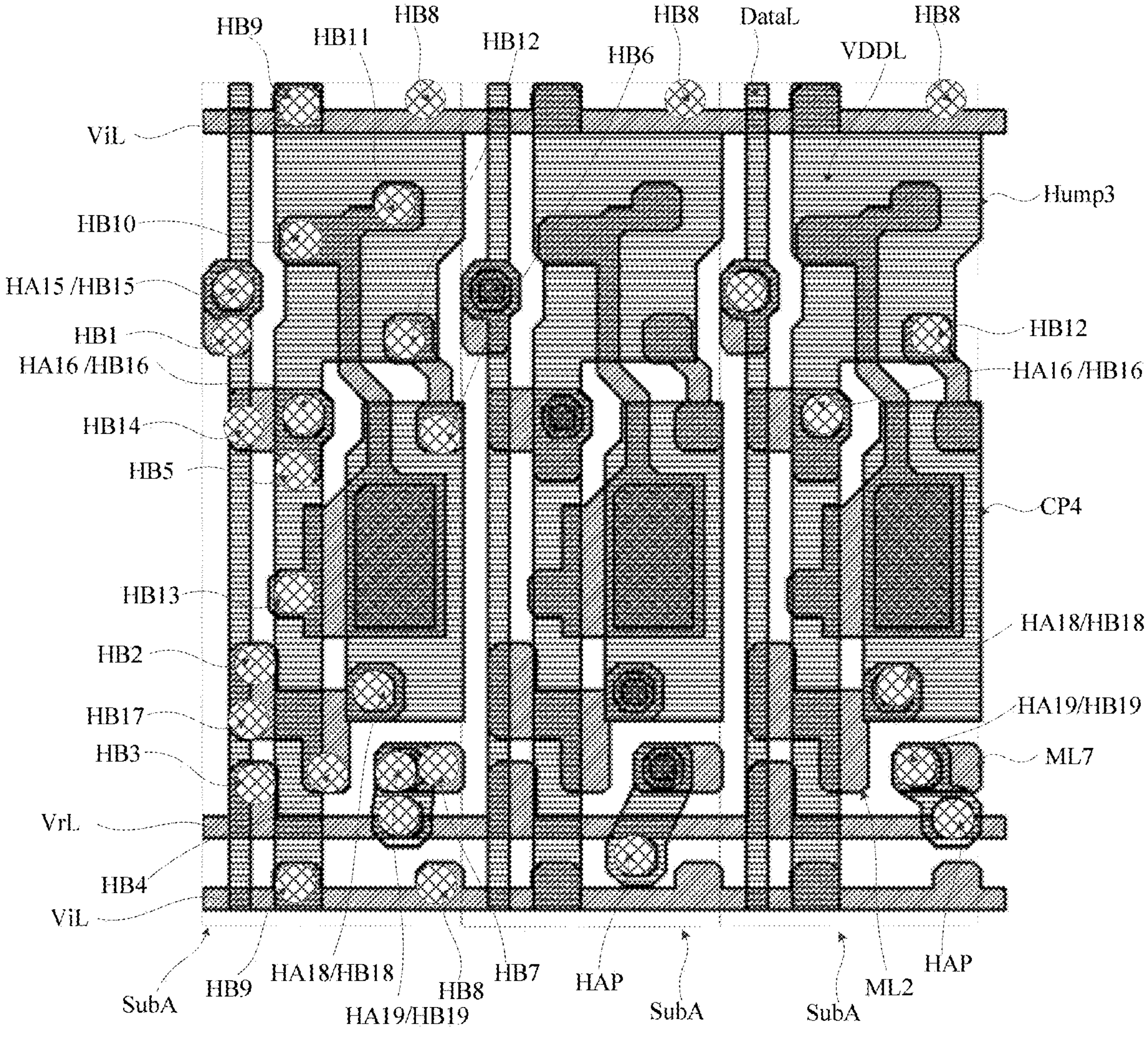
FIG. 17 is a schematic structural view of a first metal wiring layer and a second metal wiring layer that are stacked, of a display panel according to an embodiment of the present disclosure.

Optionally, referring to FIG. 17, the pixel driving circuit further includes a second metal wiring structure ML2. The second metal wiring structure ML2 connects the second electrode of the fifth transistor M5 and the second electrode of the sixth transistor M6. Thus, when the pixel driving circuit operates, the second metal wiring structure ML2 is loaded with the reference voltage Vref with a constant voltage. An orthographic projection of the second metal wiring structure ML2 on the base substrate F100 partially overlaps with the orthographic projection of the data lead DataL on the base substrate F100. Thus, a parasitic capacitance may be formed between the second metal wiring structure ML2 and the data lead DataL, thereby increasing a capacitance value of the parasitic capacitance of the data lead DataL, which is beneficial to improve the charging rate of the storage capacitor Cst.

Figure 4:
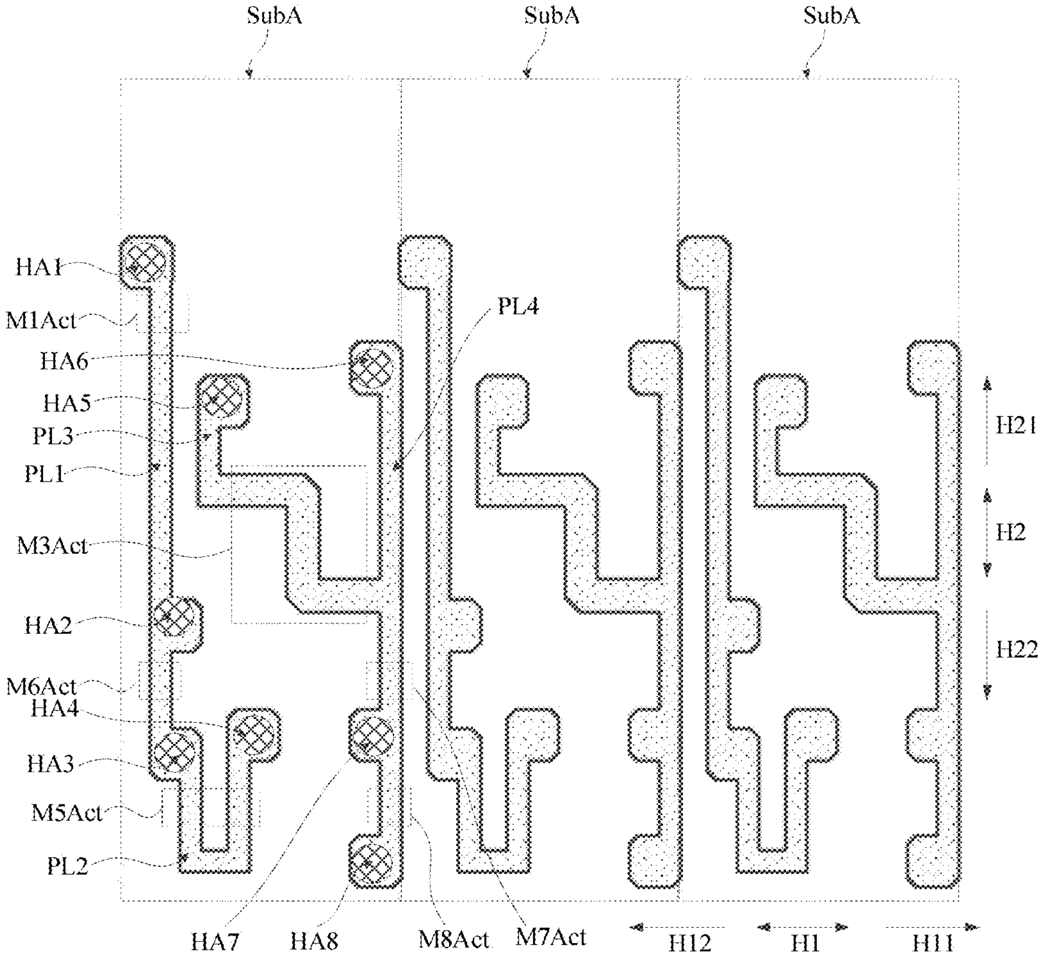
FIG. 4 is a structural view of a polysilicon semiconductor layer of a display panel according to an embodiment of the present disclosure.

In the present disclosure, referring to FIG. 4, a row direction H1 has a first row direction H11 and a second row direction H12 opposite to each other. In a same pixel driving circuit, along the row direction H1, the channel region M3Act of the driving transistor M3 is located on a side of the channel region M1Act of the first transistor M1 in the first row direction H11, and the channel region M1Act of the first transistor M1 is located on a side of the channel region M3Act of the driving transistor M3 in the second row direction H12. The column direction H2 has a first column direction H21 and a second column direction H22 opposite to each other. Along the column direction H2, the channel region M3Act of the driving transistor M3 is located on a side of the channel region M1Act of the first transistor M1 in the first column direction H21, and the channel region M1Act of the first transistor M1 is located on a side of the channel region M3Act of the driving transistor M3 in the second column direction H22.

In an embodiment of the present disclosure, in the same pixel driving circuit, the first transistor M1 and the sixth transistor M6 are linearly arranged along the first column direction H21, the seventh transistor M7 and the eighth transistor M8 are linearly arranged along the first column direction H21, and the sixth transistor M6 and the seventh transistor M7 are linearly arranged along the first row direction H11. Optionally, when the pixel driving circuit is provided with the eighth transistor M8, the fifth transistor M5 and the eighth transistor M8 are linearly arranged along the first row direction H11.

Figure 7:
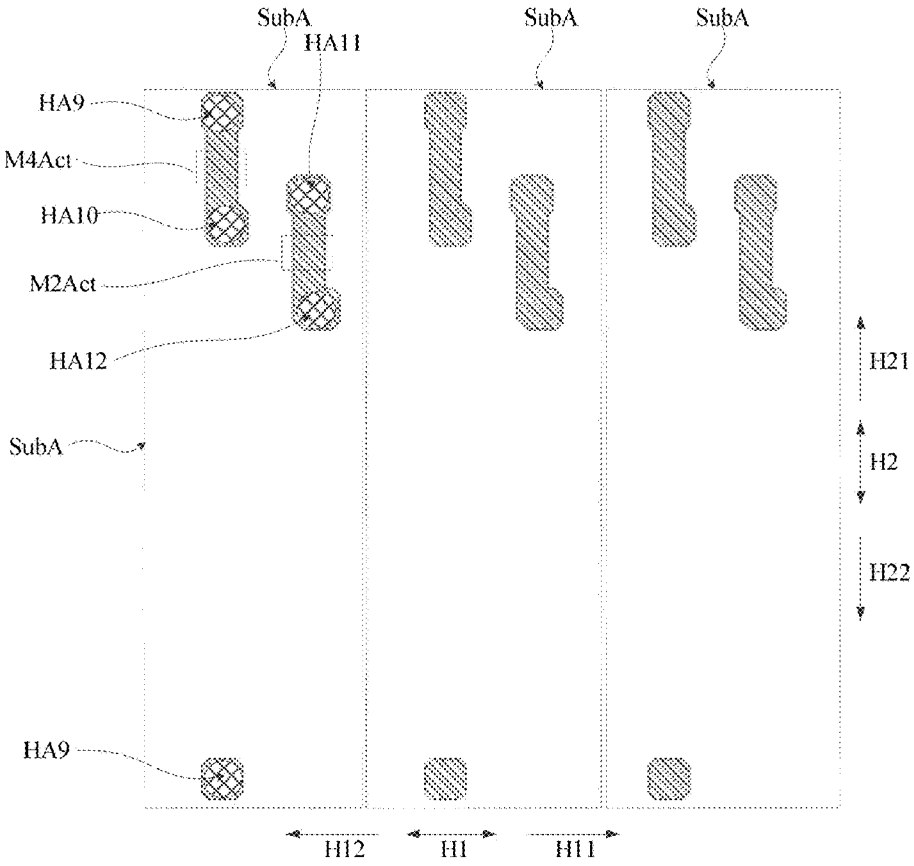
FIG. 7 is a schematic structural view of a metal oxide semiconductor layer of a display panel according to an embodiment of the present disclosure.

FIGS. 4 and 7 show a position of the channel region of each transistor in an embodiment. Referring to FIG. 4 and FIG. 7, in an embodiment of the present disclosure, in the same pixel driving circuit, the channel region M4Act of the fourth transistor M4, the channel region M2Act of the second transistor M2, the channel region M1Act of the first transistor M1, the channel region M3Act of the driving transistor M3, the channel region M6Act of the sixth transistor M6, and the channel regions M5Act of the fifth transistor M5 are sequentially arranged along the first column direction H21 on an orthographic projection of the column direction H2. It may be understood that the channel region M4Act of the fourth transistor M4, the channel region M2Act of the second transistor M2, the channel region M1Act of the first transistor M1, the channel region M3Act of the driving transistor M3, the channel region M6Act of the sixth transistor M6, and the channel region M5Act of the fifth transistor M5 may not be linearly arranged along the first column direction H21. In the same pixel driving circuit, the channel region M1Act of the first transistor M1, the channel region M4Act of the fourth transistor M4, the channel region M3Act of the driving transistor M3, and the channel region M7Act of the seventh transistor M7 are sequentially arranged along the first row direction H11, and the channel region M1Act of the first transistor M1, the channel region M4Act of the fourth transistor M4 The channel region M2Act of the second transistor M2 and the channel region M7Act of the seventh transistor M7 are sequentially arranged along the first row direction H11 on an orthographic projection of the row direction H1.

Referring to FIG. 23, from a film layer structure, the display panel includes a base substrate F100, a driving circuit layer F200, and a pixel layer F300 that are sequentially stacked.

Optionally, the base substrate F100 may be an inorganic base substrate F100 or an organic base substrate F100. For example, in an embodiment of the present disclosure, a material of the base substrate F100 may be a glass material such as soda lime glass, quartz glass, sapphire glass, or a metal material such as stainless steel, aluminum, and nickel. In another embodiment of the present disclosure, the material of the base substrate F100 may be polymethyl methacrylate (polysilicon semiconductor layer, Polymethyl methacrylate, PMMA), polyvinyl alcohol (polysilicon semiconductor layer, Polyvinyl alcohol, PVA), polyvinyl phenol (polysilicon semiconductor layer, Polyvinyl phenol, PVP), polyether sulfone (polysilicon semiconductor layer, Polyether sulfone, PES) Polyimide, polyimide, polyacetal, polycarbonate (polysilicon semiconductor layer, Poly carbonate, PC), polyethylene terephthalate (polysilicon semiconductor layer, polyethylene terephthalate, PET), polyethylene naphthalate (polysilicon semiconductor layer, polyethylene naphthalate, pen) or a combination thereof. In another embodiment of the present disclosure, the base substrate F100 may also be a flexible base substrate F100, and for example, the material of the base substrate F100 may be polyimide (polysilicon semiconductor layer, Polyimide, PI). The base substrate F100 may also be a composite of multi-layer materials. For example, in an embodiment of the present disclosure, the base substrate F100 may include a bottom film layer, a pressure-sensitive adhesive layer, a first polyimide layer and a second polyimide layer that are sequentially stacked.

Optionally, referring to FIG. 23, the driving circuit layer F200 may include a first buffer layer Buffer1, a polysilicon semiconductor layer Poly, a first gate insulating layer GI1, a first gate layer Gate1, an interlayer dielectric layer ILD, a first metal wiring layer SD1, a first planarization layer PLN1, a second metal wiring layer SD2, and a second planarization layer PLN2 that are sequentially stacked on a side of the base substrate F100. In an embodiment of the present disclosure, the driving circuit layer F200 may further include a first passivation layer PVX1 located between the first metal wiring layer SD1 and the first planarization layer PLN1. Further, in an embodiment of the present disclosure, the driving circuit layer F200 may further include a second passivation layer PVX2 located between the second metal wiring layer SD2 and the second planarization layer PLN2.

In an embodiment of the present disclosure, the pixel driving circuit of the present disclosure may be provided with a metal oxide transistor, and the driving circuit layer F200 may further include a second buffer layer Buffer2 and a metal oxide semiconductor layer Oxide that are sequentially stacked on a side of the first gate layer Gate1 away from the base substrate. The interlayer dielectric layer ILD is located on a side of the metal oxide semiconductor layer Oxide away from the base substrate. Further, the driving circuit layer may be further provided with a second gate insulating layer GI2 and a second gate layer Gate2 sequentially stacked on the side of the metal oxide semiconductor layer Oxide away from the base substrate, and the interlayer dielectric layer ILD is located on a side of the second gate layer Gate2 away from the base substrate.

Optionally, the polysilicon semiconductor layer Poly may be provided with an active layer of the first transistor M1, an active layer of the driving transistor M3, an active layer of the fifth transistor M5, an active layer of the sixth transistor M6, and an active layer of the seventh transistor M7. Further optionally, the polysilicon semiconductor layer Poly may also be provided with an active layer of the eighth transistor M8 to form the eighth transistor M8 as the third reset unit 160. It may be understood that the active layer of any one of the first transistor M1, the driving transistor M3, the fifth transistor M5, the sixth transistor M6, the seventh transistor M7, and the eighth transistor M8 may include a first electrode, a channel region, and a second electrode connected in sequence. The channel region of the transistor may maintain semiconductor characteristics, and the first electrode and the second electrode may be conductive by doping or the like. FIG. 4 shows the position of the channel region of each transistor.

Optionally, referring to FIG. 4, the polysilicon semiconductor layer Poly may also be provided with a conductive first conductive lead PL1, and the channel region M1Act of the first transistor M1 and the channel region M6Act of the sixth transistor M6 are connected through the first conductive lead PL1. Thus, the first conductive lead PL1 may be reused as the second electrode of the first transistor M1 and the second electrode of the sixth transistor M6. Further, in an pixel driving circuit, the first conductive lead PL1 extends along the column direction H2.

In an embodiment of the present disclosure, referring to FIG. 4, the first electrode of the first transistor M1 is located on a side of the channel region M1Act of the first transistor M1 away from the channel region M6Act of the sixth transistor M6, and may be provided with a first bottom via hole region HA1. The first bottom via hole region HA1 is electrically connected to the data lead DataL through a via hole such that data loaded on the data lead DataL may be loaded to the first electrode of the first transistor M1.

In an embodiment of the present disclosure, referring to FIG. 4, the first conductive lead PL1 may serve as a part of the second node N2, and an end of the first conductive lead PL1 close to the channel region M6Act of the sixth transistor M6 may be provided with a second bottom via hole region HA2. The second bottom via hole region HA2 is electrically connected to the second electrode plate CP2 and the fourth electrode plate CP4 of the storage capacitor Cst through a via hole.

In an embodiment of the present disclosure, referring to FIG. 4, the first electrode of the sixth transistor M6 and the first electrode of the fifth transistor M5 may be reused and located on a side of the channel region M6Act of the sixth transistor M6 away from the channel region M1Act of the first transistor M1. The first electrode of the sixth transistor M6 may be provided with a third bottom via hole region HA3, and the third bottom via hole region HA3 is electrically connected to the reference voltage lead VRL through a via hole such that the reference voltage Vref loaded on the reference voltage lead VRL may be loaded to the first electrodes of the sixth transistor M6 and the fifth transistor M5.

In an embodiment of the present disclosure, referring to FIG. 4, the second electrode of the fifth transistor M5 may be provided with a fourth bottom via hole region HA4, and the fourth bottom via hole region HA4 may be electrically connected to the first conductive lead PL1 through a via hole and other conductive structures, such that the second electrode of the fifth transistor M5 may be electrically connected to the second node N2.

Optionally, the channel region M5Act of the fifth transistor M5 includes a first sub-channel region and a second sub-channel region, and the polysilicon semiconductor layer Poly further includes a conductive second conductive lead PL2 connecting the first sub-channel region and the second sub-channel region in series. The first sub-channel region and the second sub-channel region both extend along the column direction H2 and are arranged along the row direction H1. The second conductive lead PL2 connects an end of the first sub-channel region in the first column direction H21 and an end of the second sub-channel region in the first column direction H21. Specifically, referring to FIG. 4, the polysilicon semiconductor layer Poly has a U-shaped bent structure between the first electrode of the fifth transistor M5 and the second electrode of the fifth transistor M5, and includes a first sub-channel region, a second conductive lead PL2, and a second sub-channel region that are sequentially connected. The first sub-channel region and the second sub-channel region are respectively located on two arms of the U-shaped bent structure. Thus, a size of a pixel driving region SubA in the column direction H2 may be reduced while increasing a length of the channel region M5Act of the fifth transistor M5.

In an embodiment of the present disclosure, referring to FIG. 4, the polysilicon semiconductor layer Poly may also be provided with a conductive third conductive lead PL3, and the third conductive lead PL3 may be reused as the first electrode of the driving transistor M3 and located on a side of the channel region M3Act of the driving transistor M3 close to the first conductive lead PL1. A fifth bottom via hole region HA5 may be provided at an end of the third conductive lead PL3 away from the channel region M3Act of the driving transistor M3, and the fifth bottom via hole region HA5 is electrically connected to the first power supply voltage lead VDDL through a via hole such that the first power supply voltage VDD loaded on the first power supply voltage lead VDDL may be loaded to the first electrode of the driving transistor M3.

In an embodiment of the present disclosure, referring to FIG. 4, the polysilicon semiconductor layer Poly may also be provided with a conductive fourth conductive lead PL4, and the fourth conductive lead PL4 may be connected to the channel region M3Act of the driving transistor M3, to be reused as the second electrode of the driving transistor M3 and serve as a part of the third node N3 of the pixel driving circuit. Optionally, the fourth conductive lead PL4 may extend along the column direction H2, and an end, located at the first column direction H21, of the fourth conductive lead PL4 may be connected to the channel region M7Act of the seventh transistor M7, such that the fourth conductive lead PL4 may be reused as the first electrode of the seventh transistor M7. An end of the fourth conductive lead PL4 in the second column direction H22 may be provided with a sixth bottom via hole region HA6, and the sixth bottom via hole region HA6 is connected to the second electrode of the second transistor M2 through a via hole.

In an embodiment of the present disclosure, referring to FIG. 4, the second electrode of the seventh transistor M7 is located on a side of the channel region M7Act of the seventh transistor M7 away from the fourth conductive lead PL4, and is provided with the seventh bottom via hole region HA7. The seventh bottom via hole region HA7 is electrically connected to the light emitting element 170 through a via hole. The second electrode of the seventh transistor M7 may serve as a part of the fourth node N4 of the pixel driving circuit.

In an embodiment of the present disclosure, referring to FIG. 4, the pixel driving circuit is provided with an eighth transistor M8, a channel region M8Act of the eighth transistor M8 is located on a side of the channel region M7Act of the seventh transistor M7 in the first column direction H21, and the second electrode of the seventh transistor M7 is reused as the second electrode of the eighth transistor M8. The first electrode of the eighth transistor M8 is located on a side of the channel region M8Act of the eighth transistor M8 away from the channel region M7Act of the seventh transistor M7, and is provided with an eighth bottom via hole region HA8, and the eighth bottom via hole region HA8 is electrically connected to the initialization signal lead ViL through a via hole such that the initialization voltage Vinit loaded on the initialization signal lead VIL is loaded to the first electrode of the eighth transistor M8.

Figure 5:
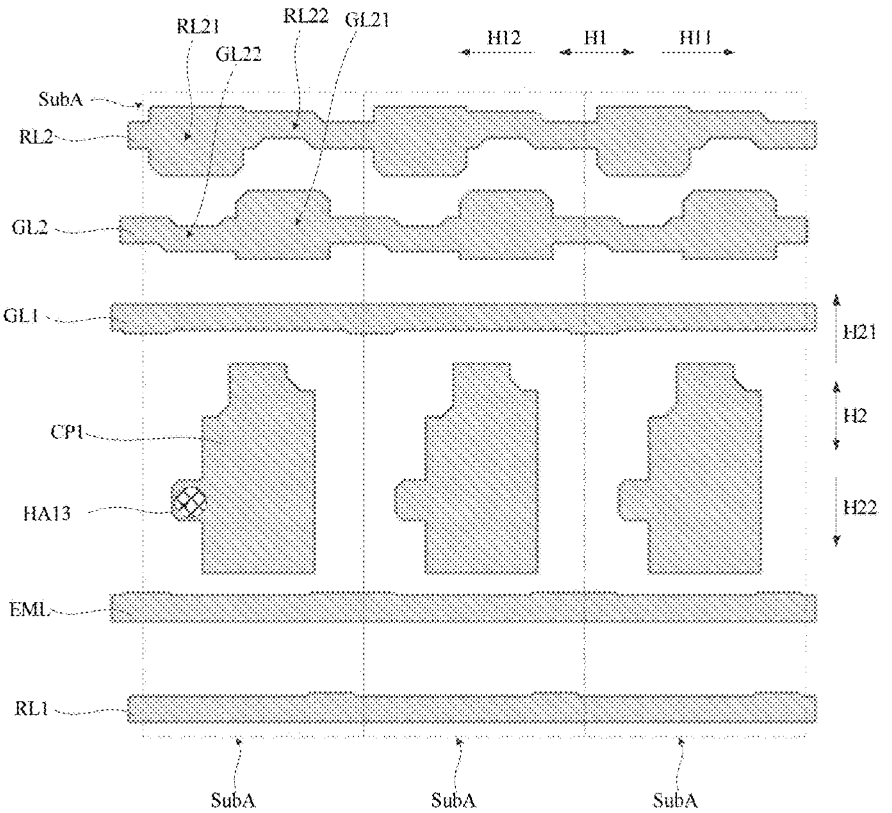
FIG. 5 is a structural view of a first gate layer of a display panel according to an embodiment of the present disclosure.

Referring to FIG. 5, the first gate layer Gate1 may be provided with a first scan lead GL1 configured to load the first scan signal Gate_P, a first electrode plate CP1, a light emitting control lead EML configured to load the light emitting control signal EM and a first reset lead RL1 configured to load the first reset signal Re_P. Optionally, the first scan lead GL1, the light emitting control lead EML, and the first reset lead RL1 extend along the row direction H1, and a plurality of pixel driving circuits arranged along the row direction H1 may share a same first scan lead GL1, the light emitting control lead EML, and the first reset lead RL1.

Figure 6:
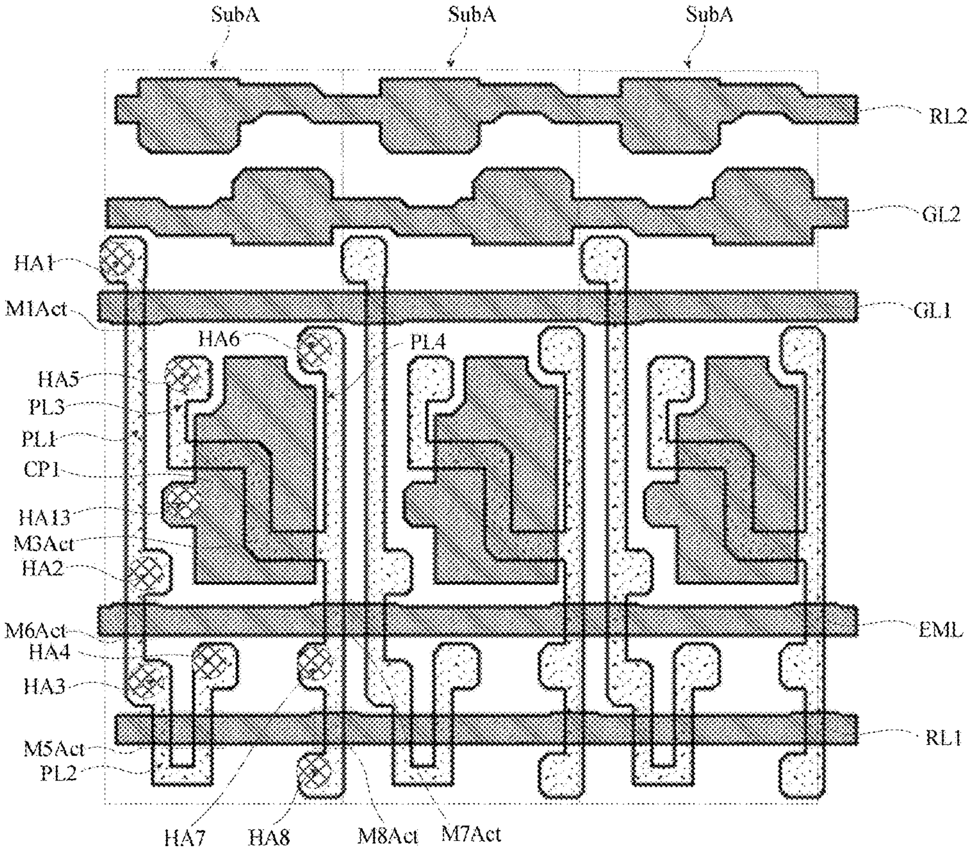
FIG. 6 is a schematic structural view of a stacked polysilicon semiconductor layer and a first gate layer that are stacked, of a display panel in an embodiment of the present disclosure.

The first gate layer Gate1 may be provided with a gate of the first transistor M1, and the gate of the first transistor M1 is connected to the first scan lead GL1, such that the first transistor M1 may be turned on in response to the first scan signal Gate_P. In an embodiment of the present disclosure, referring to FIG. 6, an orthographic projection of the channel region Act of the first transistor M1 on the base substrate F100 is located within an orthographic projection of the first scan lead GL1 on the base substrate F100. In other words, the first scan lead GL1 may overlap with the channel region M1Act of the first transistor M1 such that an overlapping part is reused as the gate of the first transistor M1.

The first gate layer Gate1 may be provided with a gate of the sixth transistor M6, and the gate of the sixth transistor M6 is connected to the light emitting control lead EML such that the sixth transistor M6 may be turned on in response to the light emitting control signal EM. In an embodiment of the present disclosure, referring to FIG. 6, an orthographic projection of the channel region of the sixth transistor M6 on the base substrate F100 is located within an orthographic projection of the light emitting control lead EML on the base substrate F100. In other words, the light emitting control lead EML may overlap with the channel region M6Act of the sixth transistor M6 such that an overlapping part is reused as the gate of the sixth transistor M6.

The first gate layer Gate1 may be provided with a gate of the seventh transistor M7, and the gate of the seventh transistor M7 is connected to the light emitting control lead EML such that the seventh transistor M7 may be turned on in response to the light emitting control signal EM. In an embodiment of the present disclosure, referring to FIG. 6, an orthographic projection of the channel region of the seventh transistor M7 on the base substrate F100 is located within an orthographic projection of the light emitting control lead EML on the base substrate F100. In other words, the light emitting control lead EML may overlap with the channel region M7Act of the seventh transistor M7 such that an overlapping part is reused as the gate of the seventh transistor M7.

The first gate layer Gate1 may be provided with a gate of the fifth transistor M5, and the gate of the fifth transistor M5 is connected to the first reset lead RL1 such that the fifth transistor M5 may be turned on in response to the first reset signal Re_P. In an embodiment of the present disclosure, referring to FIG. 6, the first reset lead RL1 may overlap with the channel region M5Act of the fifth transistor M5 such that an overlapping part is reused as the gate of the fifth transistor M5. For example, orthographic projections of the first sub-channel region and the second sub-channel region on the base substrate are located within an orthographic projection of the first reset lead RL1 on the base substrate.

The first gate layer Gate1 may be provided with a gate of the eighth transistor M8, and the gate of the eighth transistor M8 is connected to the first reset lead RL1 such that the eighth transistor M8 may be turned on in response to the first reset signal Re_P. In an embodiment of the present disclosure, referring to FIG. 6, an orthographic projection of the channel region ACT of the eighth transistor M8 on the base substrate F100 is located within an orthographic projection of the first reset lead RL1 on the base substrate F100. In other words, the first reset lead RL1 may overlap with the channel region M8Act of the eighth transistor M8 such that an overlapping part is reused as the gate of the eighth transistor M8.

The first electrode plate CP1 may cover the channel region M3Act of the driving transistor M3 to be reused as the gate of the driving transistor M3. Thus, the first electrode plate CP1 may be a part of the first node N1 node. In an embodiment of the present disclosure, referring to FIG. 6, a boundary of a side of the first electrode plate CP1 in the first row direction H11 is close to the fourth conductive lead PL4, and extends along the column direction H2 towards the first column direction H21 and the second column direction H22. In this way, an area of the first electrode plate CP1 may be increased as much as possible, thereby facilitating the increase of the capacitance value of the storage capacitor Cst.

In an embodiment of the present disclosure, referring to FIG. 5, the first electrode plate CP1 may be provided with a thirteenth bottom via hole region HA13, and the thirteenth bottom via hole region HA13 is electrically connected to the third electrode plate CP3 through a via hole. Further, a side of the first electrode plate CP1 close to L1 may be provided with a protruding portion, which is located on a side of the third conductive lead PL3 in the first column direction H21. The thirteenth bottom via hole region HA13 is located at the protruding portion.

Optionally, in the pixel driving region SubA, the first scan lead GL1, the first electrode plate CP1, the light emitting control lead EML, and the first reset lead RL1 are sequentially provided along the first column direction H21.

Optionally, the gate of the fourth transistor M4 includes a first gate of the fourth transistor M4 located at the first gate layer Gate1. Referring to FIG. 5, the first gate layer Gate1 may also be provided with a second reset lead RL2 configured to load the second reset signal Re_N, and the second reset lead RL2 is electrically connected to the first gate of the fourth transistor M4, such that the fourth transistor M4 may be turned on in response to the second reset signal Re_N. Further, the second reset lead RL2 extends along the row direction H1 such that each pixel driving circuit provided in the same row may share a same second reset lead RL2.

In an embodiment of the present disclosure, the fourth transistor M4 may be a metal oxide transistor. Referring to FIG. 7, the channel region M4Act of the fourth transistor M4 is located within the metal oxide semiconductor layer Oxide, an orthographic projection of the channel region M4Act of the fourth transistor M4 on the first gate layer Gate1 may be completely located within the first gate of the fourth transistor M4. In this way, the first gate of the fourth transistor M4 may shield the light on the base substrate side from irradiating the channel region M4Act of the fourth transistor M4, so as to avoid the leakage current of the fourth transistor M4 from increasing in the turn-off state caused by the light.

Figure 11:
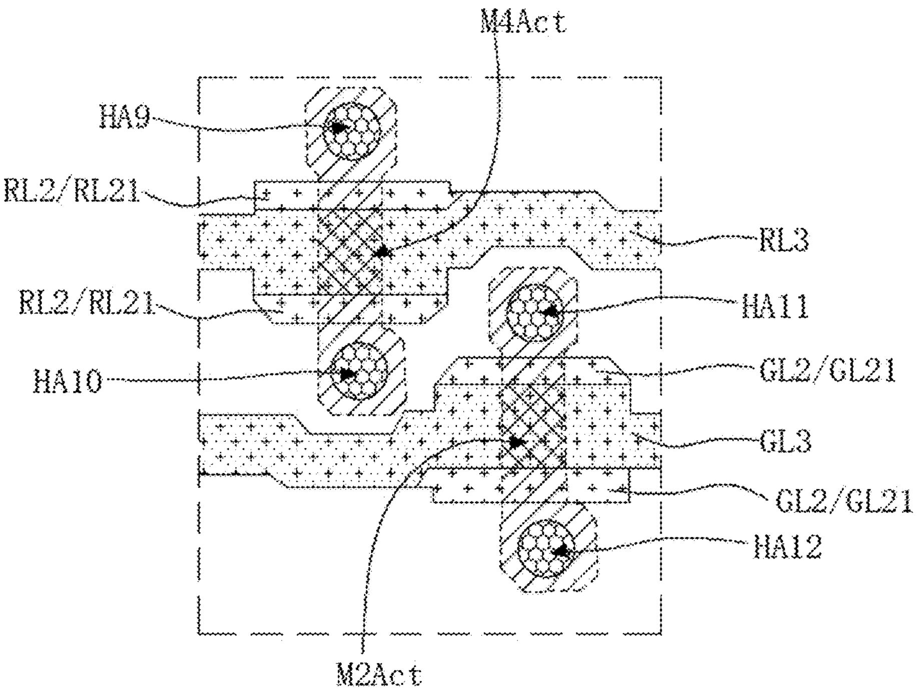
FIG. 11 is a partial structural view of a polysilicon semiconductor layer, a first gate layer and a second gate layer that are stacked, of a display panel according to an embodiment of the present disclosure.

In an embodiment of the present disclosure, referring to FIG. 11, the second reset lead RL2 may overlap with the channel region M4Act of the fourth transistor M4 provided in the metal oxide semiconductor layer Oxide to be reused as the first gate of the fourth transistor M4. For example, referring to FIG. 5, along the row direction H1, the second reset lead RL2 may include a third lead segment RL21 and a fourth lead segment RL22 that are alternately arranged and sequentially connected. A size of the third lead segment RL21 in the column direction H2 is larger than a size of the fourth lead segment RL22 in the column direction H2. The orthographic projection of the channel region M4Act of the fourth transistor M4 on the first gate layer Gate1 may be completely located within the third lead segment RL21, such that a part of the third lead segment RL21 may serve as the first gate of the fourth transistor M4.

Optionally, the gate of the second transistor M2 includes the first gate of the second transistor M2 located at the first gate layer Gate1. Referring to FIG. 5, the first gate layer Gate1 may also be provided with a second scan lead GL2 configured to load the second scan signal Gate_N, and the second scan lead GL2 is electrically connected to the first gate of the second transistor M2, such that the second scan signal Gate_N may be loaded to the first gate of the second transistor M2. In this way, the second transistor M2 may be turned on in response to the second scan signal Gate_N. Further, the second scan lead GL2 extends along the row direction H1 such that each pixel driving circuit provided in a same row may share a same second scan lead GL2.

In an embodiment of the present disclosure, the second transistor M2 may be a metal oxide transistor. Referring to FIG. 7, the channel region M2Act of the second transistor M2 is located within the metal oxide semiconductor layer Oxide. The orthographic projection of the channel region M2Act of the second transistor M2 on the first gate layer Gate1 may be completely located within the first gate of the second transistor M2. In this way, the first gate of the second transistor M2 may shield the light on the base substrate side from irradiating the channel region M2Act of the second transistor M2, so as to avoid the leakage current of the second transistor M2 from increasing in the turn-off state caused by the light.

In an embodiment of the present disclosure, referring to FIG. 11, the second scan lead GL2 may overlap with the channel region M2Act of the second transistor M2 provided in the metal oxide semiconductor layer Oxide to be reused as the first gate of the second transistor M2. For example, referring to FIG. 5, along the row direction H1, the second scan lead GL2 may include a first lead segment GL21 and a second lead segment GL22 that are alternately arranged and sequentially connected. A size of the first lead segment GL21 in the column direction H2 is larger than a size of the second lead segment GL22 in the column direction H2. Referring to FIG. 11, an orthographic projection of the channel region M2Act of the second transistor M2 on the first gate layer Gate1 may be completely located within the first lead segment GL21, such that a part of the first lead segment GL21 may serve as the first gate of the second transistor M2.

In an embodiment of the present disclosure, in the pixel driving region SubA, the second reset lead RL2, the second scan lead GL2, the first scan lead GL1, the first electrode plate CP1, the light emitting control lead EML, and the first reset lead RL1 are sequentially arranged along the first column direction H21.

In some embodiments of the present disclosure, referring to FIG. 23, the driving circuit layer F200 may include a second buffer layer Buffer2 and a metal oxide semiconductor layer Oxide sequentially stacked on a side of the first gate layer Gate1 away from the base substrate F100. In this way, the pixel driving circuit of the present disclosure may be provided with a metal oxide transistor, and the channel region of the transistor is located within the metal oxide semiconductor layer Oxide.

Optionally, the fourth transistor M4 may be a metal oxide transistor. The active layer of the fourth transistor M4 is located within the metal oxide semiconductor layer Oxide, and includes a first electrode, a channel region M4Act, and a second electrode that are sequentially connected. That is, the second electrode of the fourth transistor M4 and the first electrode of the fourth transistor M4 are located on the metal oxide semiconductor layer Oxide and on both sides of the channel region M4Act of the fourth transistor M4. The second electrode of the fourth transistor M4 and the first electrode of the fourth transistor M4 may be a conductive metal oxide, and the channel region M4Act of the fourth transistor M4 maintains semiconductor characteristics.

Optionally, referring to FIG. 7, the first electrode of the fourth transistor M4, the channel region M4Act of the fourth transistor M4, and the second electrode of the fourth transistor M4 are arranged along the first column direction H21. The first electrode of the fourth transistor M4 is provided with a ninth bottom via hole region HA9, and the ninth bottom via hole region HA9 is electrically connected to the initialization signal lead ViL through a via hole such that the initialization voltage Vinit may be loaded to the first electrode of the fourth transistor M4. The second electrode of the fourth transistor M4 is provided with a tenth bottom via hole region HA10, and the tenth bottom via hole region HA10 is electrically connected to the third electrode plate CP3 through a via hole.

In an embodiment of the present disclosure, two initialization signal leads ViL extending along the row direction H1 are passed through an pixel driving region SubA, one of which is located at an end of the pixel driving region in the first column direction H21 and the other is located at an end of the pixel driving region in the second column direction H22. In an pixel driving region SubA, the ninth bottom via hole region HA9 of the pixel driving circuit in the pixel driving region SubA may be electrically connected to the initialization signal lead VIL located at an end of the second column direction H22 through a via hole. The eighth bottom via hole region HA8 of the pixel driving circuit in the pixel driving region SubA may be electrically connected to the initialization signal lead ViL located at an end in the first column direction H21 through a via hole. Accordingly, two adjacent pixel driving regions SubA along the column direction H2 have an overlapping region, and the initialization signal lead ViL is provided in the overlapping region, and the initialization signal lead VIL is shared by the pixel driving circuits in the adjacent two rows of pixel driving regions SubA. That is, the initialization signal lead ViL is an initialization signal lead ViL located at an end of a previous pixel driving region SubA in the first column direction H21, and is an initialization signal lead ViL located at an end of a next pixel driving region SubA in the second column direction H22.

Optionally, the second transistor M2 may be a metal oxide transistor. The active layer of the second transistor M2 is located within the metal oxide semiconductor layer Oxide, and includes a first electrode, a channel region M2Act, and a second electrode that are sequentially connected. That is, the second electrode of the second transistor M2 and the first electrode of the second transistor M2 are located on the metal oxide semiconductor layer Oxide and on both sides of the channel region M2Act of the second transistor M2; The second electrode of the second transistor M2 and the first electrode of the second transistor M2 may be a conductive metal oxide, and the channel region M2Act of the second transistor M2 maintains semiconductor characteristics.

Optionally, referring to FIG. 7, the first electrode of the second transistor M2, the channel region M2Act of the second transistor M2, and the second electrode of the second transistor M2 are arranged along the second column direction H22. The second electrode of the second transistor M2 is provided with an eleventh bottom via hole region HA11, and the eleventh bottom via hole region HA11 is electrically connected to the third electrode plate CP3 through a via hole. The first electrode of the second transistor M2 is provided with a twelfth bottom via hole region HA12, and the twelfth bottom via hole region HA12 is electrically connected to the fourth conductive lead PL4 through a via hole.

In an embodiment of the present disclosure, in the pixel driving region SubA, the channel region M4Act of the fourth transistor M4 and the channel region M2Act of the second transistor M2 are located on a side of the first scan lead GL1 in the second column direction H22, and the channel region M4Act of the fourth transistor M4 is located on a side of the channel region M2Act of the second transistor M2 in second column direction H22.

In some embodiments of the present disclosure, referring to FIG. 23, the driving circuit layer F200 may also be provided with a second gate insulating layer GI2 and a second gate layer Gate2 that are sequentially stacked on a side of the metal oxide semiconductor layer Oxide away from the base substrate F100, and the interlayer dielectric layer ILD is located on a side of the second gate layer Gate2 away from the base substrate.

Figure 8:
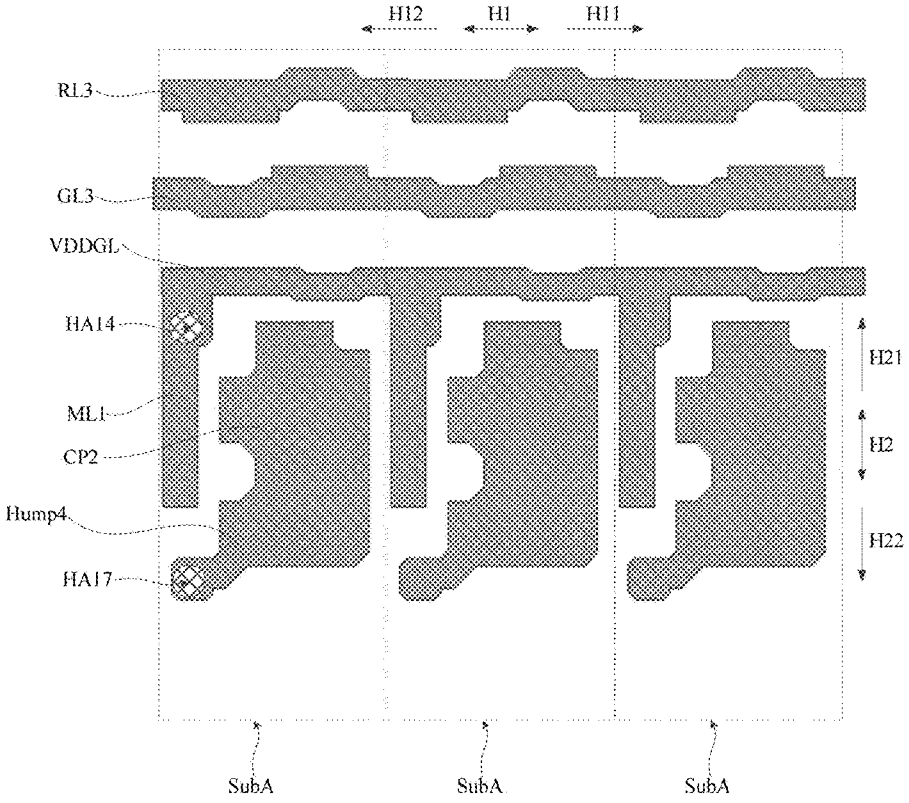
FIG. 8 is a structural view of a second gate layer of a display panel according to an embodiment of the present disclosure.

Referring to FIG. 8, the second gate layer Gate2 may be provided with a second electrode plate CP2 that partially overlaps with the first electrode plate CP1. In an embodiment of the present disclosure, referring to FIG. 10, the second electrode plate CP2 is defined with a notch exposing the thirteenth bottom via hole region HA13, such that an orthographic projection of the second electrode plate CP2 on the first gate layer Gate1 does not overlap with the thirteenth bottom via hole region HA13. Thus, the thirteenth bottom via hole region HA13 may be connected to the third electrode plate CP3 through the notch. Further, the notch is located on a side of the second electrode plate CP2 in the second row direction H12.

Referring to FIG. 8, the second electrode plate CP2 may be provided with a seventeenth bottom via hole region HA17, and the seventeenth bottom via hole region HA17 is electrically connected to the fourth electrode plate CP4 through a via hole. Thus, the storage capacitor Cst includes a first electrode plate CP1, a second electrode plate CP2, a third electrode plate CP3, and a fourth electrode plate CP4 that are sequentially stacked. The first electrode plate CP1 and the third electrode plate CP3 are electrically connected through a via hole, and the second electrode plate CP2 and the fourth electrode plate CP4 are electrically connected through a via hole. In an embodiment of the present disclosure, referring to FIG. 8, the second electrode plate CP2 is provided with the fourth protruding portion Hump4, and the seventeenth bottom via hole region HA17 is arranged at the fourth protruding portion Hump4. Further, the fourth protruding portion Hump4 does not overlap with the first electrode plate CP1. For example, the fourth protruding portion Hump4 is provided on a side of the second electrode plate CP2 in the first column direction H21 and on a side in the second row direction H12, and may extend to overlap with the channel region M6Act of the sixth transistor M6.

Optionally, the gate of the fourth transistor M4 includes the second gate of the fourth transistor M4 located at the second gate layer Gate2. Referring to FIG. 8, the second gate layer Gate2 may also be provided with a third reset lead RL3 configured to load the second reset signal Re_N. The third reset lead RL3 is electrically connected to the second gate of the fourth transistor M4, such that the second reset signal Re_N may be loaded to the second gate of the fourth transistor M4. In this way, the fourth transistor M4 may be turned on in response to the second reset signal Re_N. Further, the third reset lead RL3 extends along the row direction H1 such that each pixel driving circuit provided in a same row may share a same third reset lead RL3.

Figure 9:
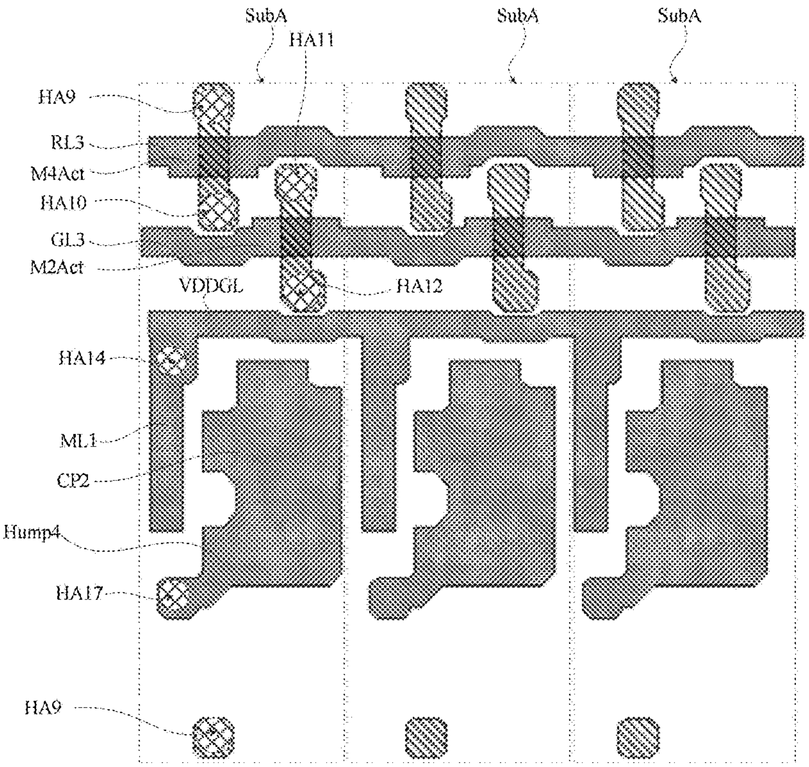
FIG. 9 is a schematic structural view of a metal oxide semiconductor layer and a second gate layer that are stacked, of a display panel according to an embodiment of the present disclosure.

In an embodiment of the present disclosure, the fourth transistor M4 may be a metal oxide transistor, the channel region M4Act of the fourth transistor M4 is located within the metal oxide semiconductor layer Oxide, and an orthographic projection of the channel region M4Act of the fourth transistor M4 on the second gate layer Gate2 may overlap with the second gate of the fourth transistor M4. Further, the third reset lead RL3 may overlap with the channel region M4Act of the fourth transistor M4 provided in the metal oxide semiconductor layer Oxide to be reused as the second gate of the fourth transistor M4. For example, referring to FIGS. 9 and 11, the third reset lead RL3 extends along the row direction H1 and overlaps with the active layer of the fourth transistor M4. A part where the third reset lead RL3 overlaps with the active layer of the fourth transistor M4 may be reused as the second gate of the fourth transistor M4, and a part where the active layer of the fourth transistor M4 overlaps with the third reset lead RL3 may serve as the channel region M4Act of the fourth transistor M4.

In an embodiment of the present disclosure, the gate of the fourth transistor M4 includes the first gate of the fourth transistor M4 located at the first gate layer Gate1 and the second gate of the fourth transistor M4 located at the second gate layer Gate2. Thus, the fourth transistor M4 has a double gate structure, which may eliminate the influence of the floating body effect and reduce the leakage current in the turn-off state.

Optionally, the gate of the second transistor M2 includes the second gate of the second transistor M2 located at the second gate layer Gate2. Referring to FIG. 8, the second gate layer Gate2 may also be provided with a third scan lead GL3 configured to load the second scan signal Gate_N. the third scan lead GL3 is electrically connected to the second gate of the second transistor M2, such that the second scan signal Gate_N may be loaded to the second gate of the second transistor M2. In this way, the second transistor M2 may be turned on in response to the second scan signal Gate_N. Further, the third scan lead GL3 extends along the row direction H1 such that each pixel driving circuit provided in a same row may share a same third scan lead GL3.

In an embodiment of the present disclosure, the second transistor M2 may be a metal oxide transistor, the channel region M2Act of the second transistor M2 is located within the metal oxide semiconductor layer Oxide, and an orthographic projection of the channel region M2Act of the second transistor M2 on the second gate layer Gate2 may overlap with the second gate of the second transistor M2. Further, referring to FIG. 11, the third scan lead GL3 may overlap with the channel region M2Act of the second transistor M2 provided in the metal oxide semiconductor layer Oxide to be reused as the second gate of the second transistor M2. For example, the third scan lead GL3 extends along the row direction H1 and overlaps with the active layer of the second transistor M2. A part where the third scan lead GL3 overlaps with the active layer of the second transistor M2 may be reused as the second gate of the second transistor M2, and a part where the active layer of the second transistor M2 overlaps with the third scan lead GL3 may serve as the channel region M2Act of the second transistor M2.

In an embodiment of the present disclosure, the gate of the second transistor M2 includes the first gate of the second transistor M2 located at the first gate layer Gate1 and the second gate of the second transistor M2 located at the second gate layer Gate2. Thus, the second transistor M2 has a double gate structure, which may eliminate the influence of the floating body effect and reduce the leakage current in the turn-off state.

Optionally, referring to FIG. 8, the second gate layer Gate2 may also be provided with a power distribution lead VDDGL extending along the row direction H1, and the power distribution lead VDDGL may be electrically connected to one or more first power supply voltage leads VDDL of the display panel. In this way, the wiring conducting the first power supply voltage VDD may arranged in a grid manner, a voltage drop during the transmission of the first power supply voltage VDD may be reduced, and the uniformity of the first power supply voltage VDD at different positions may be improved.

In an embodiment of the present disclosure, in the pixel driving region SubA, the power distribution lead VDDGL is provided between the third scan lead GL3 and the second electrode plate CP2.

In an embodiment of the present disclosure, the power distribution lead VDDGL extends along the row direction H1 and is electrically connected to each first power supply voltage lead VDDL extending along the column direction H2.

Figure 10:
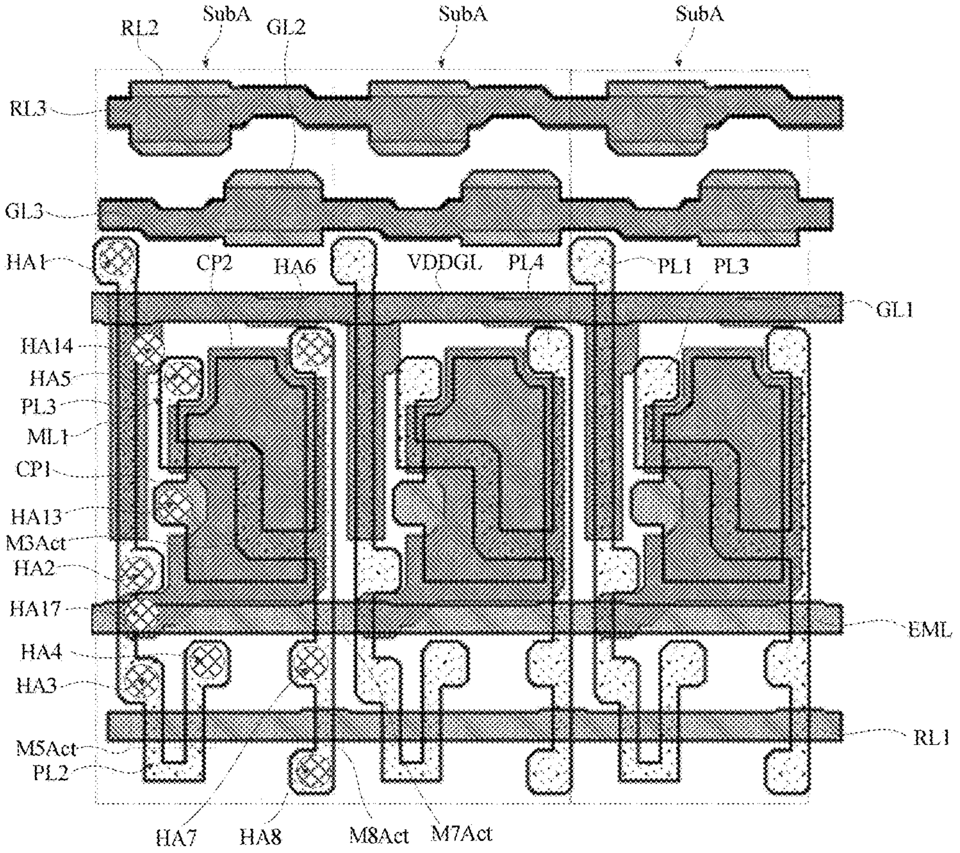
FIG. 10 is a schematic structural view of a polysilicon semiconductor layer, a first gate layer and a second gate layer that are stacked, of a display panel according to an embodiment of the present disclosure.

Optionally, in the pixel driving region SubA, referring to FIGS. 8 and 10, the second gate layer Gate2 may also be provided with a first metal wiring structure ML1, and the first metal wiring structure ML1 extends along the column direction H2 and at least partially overlaps with the first conductive lead PL1. The first metal wiring structure ML1 may be electrically connected to the first power supply voltage lead VDDL such that the first power supply voltage VDD may be loaded on the first metal wiring structure ML1. In this way, the first metal wiring structure ML1 may be loaded with a constant voltage signal, which may stabilize a voltage on the first conductive lead PL1, avoid the interference of other signals on the voltage on the first conductive lead PL1, especially the interference of the signal on the data lead DataL on the voltage on the first conductive lead PL1, and reduce the crosstalk of the display panel in a longitudinal direction (column direction H2). In addition, a parasitic capacitance may also be formed between the first metal wiring structure ML1 and the data lead DataL, thereby increasing the parasitic capacitance of the data lead DataL, facilitating the data lead DataL to retain charge and improve the charging ability of the storage capacitor Cst, and thus improving the accuracy of Data written in the storage capacitor Cst. Thus, the display panel is more suitable for De-MUX driving.

In an embodiment of the present disclosure, both the first metal wiring structure ML1 and the first conductive lead PL1 extend along the column direction H2, and an orthographic projection of the first conductive lead PL1 in the row direction H1 is located within an orthographic projection of the first metal wiring structure ML1 in the row direction H1. Thus, a width of the first metal wiring structure ML1 is larger than a width of the first conductive lead PL1, so as to better shield the first conductive lead PL1. Further, in the column direction H2, the first metal wiring structure ML1 exposes the second bottom via hole region HA2 and covers other parts of the first conductive lead PL1.

In an embodiment of the present disclosure, referring to FIG. 8, the first metal wiring structure ML1 is provided with a fourteenth bottom via hole region HA14, and the fourteenth bottom via hole region HA14 is electrically connected to the first power supply voltage lead VDDL through a via hole. Further, an end of the first metal wiring structure ML1 in the second column direction H22 is connected to the power distribution lead VDDGL, such that the power distribution lead VDDGL is electrically connected to the first power supply voltage lead VDDL through the first metal wiring structure ML1.

Figure 12:
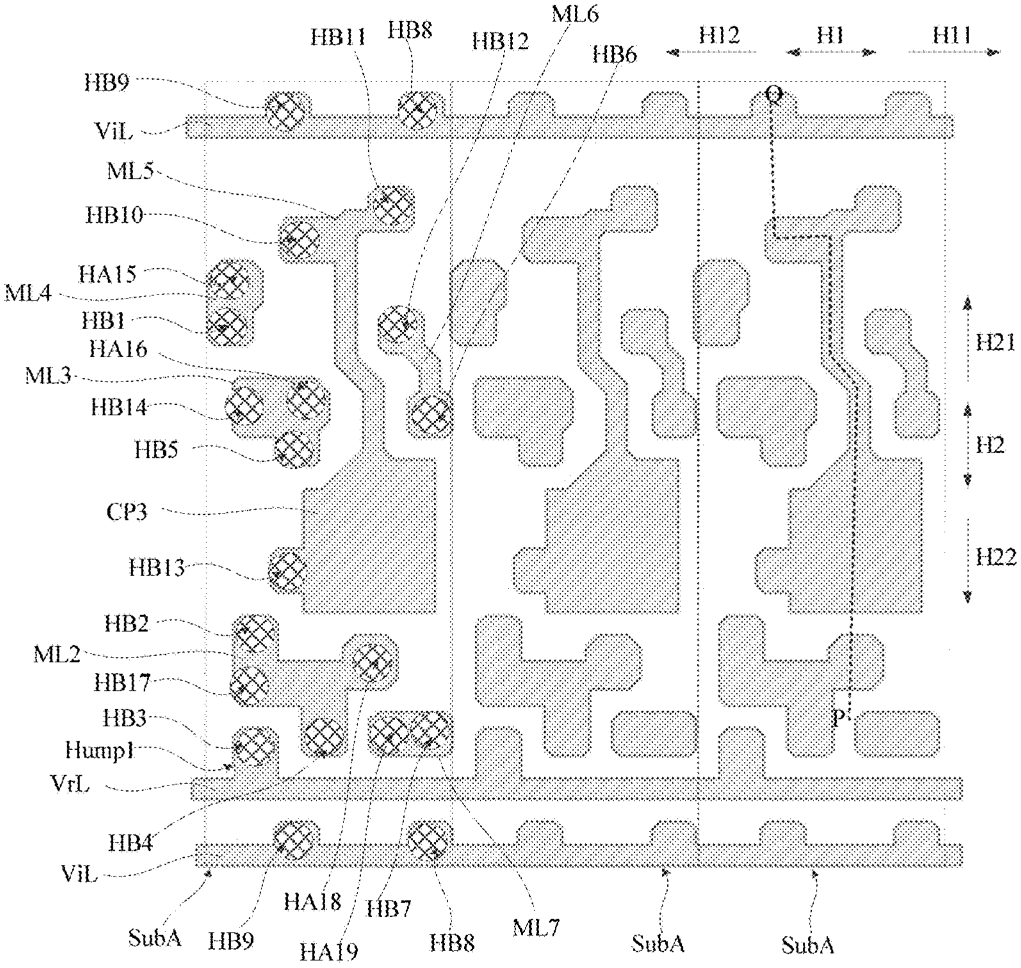
FIG. 12 is a structural view of a first metal wiring layer of a display panel according to an embodiment of the present disclosure.

Referring to FIG. 12, the first metal wiring layer SD1 may be provided with a third electrode plate CP3, an initialization signal lead VIL, and a reference voltage lead VRL. The initialization signal lead VIL extends along the row direction H1 and is configured to load the initialization voltage Vinit. The reference voltage lead VRL may extend along the row direction H1 and be configured to load the reference voltage Vref. The third electrode plate CP3 may at least partially overlap with the second electrode plate CP2 and be electrically connected to the first electrode plate CP1 through a via hole.

Figure 13:
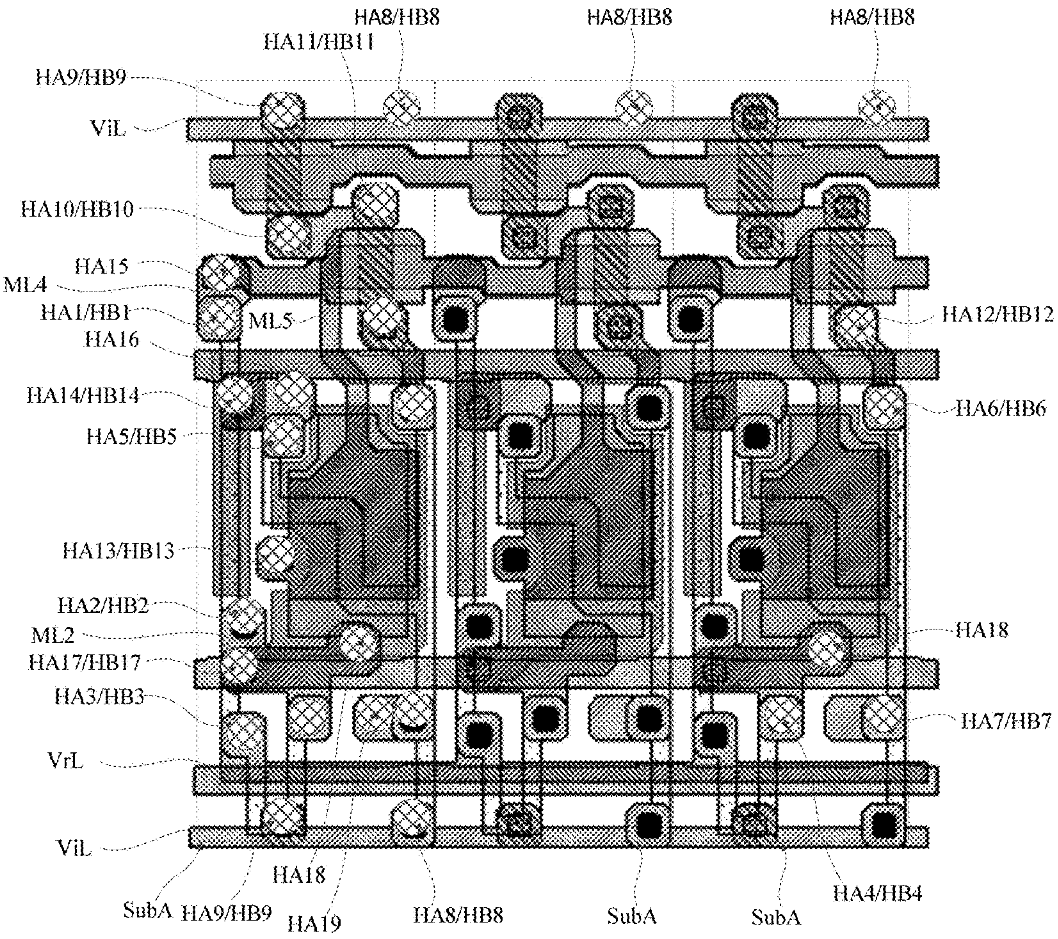
FIG. 13 is a schematic structural view of a polysilicon semiconductor layer, a first gate layer, a metal oxide semiconductor layer, a second gate layer and a first metal wiring layer that are stacked, of a display panel according to an embodiment of the present disclosure.

Optionally, referring to FIGS. 12 and 13, the initialization signal lead VIL is provided with an eighth top via hole region HB8 and a ninth top via hole region HB9. The eighth top via hole region HB8 and the eighth bottom via hole region HA8 may be directly connected through a via hole, such that the first electrode of the eighth transistor M8 is connected to the initialization signal lead ViL through a via hole. The ninth top via hole region HB9 and the ninth bottom via hole region HA9 may be directly connected through a via hole, such that the first electrode of the fourth transistor M4 is connected to the initialization signal lead ViL through a via hole.

Optionally, referring to FIGS. 12 and 13, the reference voltage lead VRL is provided with a third top via hole region HB3, and the third top via hole region HB3 and the third bottom via hole region HA3 may be directly connected through a via hole. Further, referring to FIGS. 12 and 17, the reference voltage lead VRL is provided with a first protruding portion Hump1 that extends along the column direction H2 and may overlap with the data lead DataL located on the second metal wiring layer SD2. In this way, a larger parasitic capacitance is formed between the data lead DataL and the reference voltage lead VRL, which is beneficial for driving the display panel by De-MUX manner.

In an embodiment of the present disclosure, the reference voltage lead VRL partially overlaps with the first reset lead RL1, and the first protruding portion Hump1 extends along the second column direction H22 to overlap with the third bottom via hole region HA3, and the third top via hole region HB3 is arranged at an end of the first protruding portion Hump1 in the second column direction H22.

Optionally, referring to FIGS. 12 and 13, the third electrode plate CP3 may be provided with a thirteenth top via hole region HB13, and the thirteenth top via hole region HB13 and the thirteenth bottom via hole region HA13 may be directly connected through a via hole, such that the third electrode plate CP3 and the first electrode plate CP1 are connected through the via hole. In an embodiment of the present disclosure, the third electrode plate CP3 may be provided with a protruding portion extending toward a side of the second row direction H12, and the thirteenth top via hole region HB13 is provided on the protruding portion.

Optionally, referring to FIG. 12, the first metal wiring layer SD1 may also be provided with a second metal wiring structure ML2 arranged between the third electrode plate CP3 and the reference voltage lead VRL. The second metal wiring structure ML2 may be provided with a second top via hole region HB2, a fourth top via hole region HB4, and a seventeenth top via hole region HB17. Referring to FIG. 13, the second top via hole region HB2 and the second bottom via hole region HA2 are directly connected through a via hole, the fourth top via hole region HB4 and the fourth bottom via hole region HA4 are directly connected through a via hole, and the seventeenth top via hole region HB17 and the seventeenth bottom via hole region HA17 are directly connected through a via hole. In this way, the second metal wiring structure ML2 enables the second electrode of the first transistor M1, the second electrode of the fifth transistor M5, the second electrode of the sixth transistor M6, and the second electrode plate CP2 to be electrically connected to each other as a part of the second node N2 of the pixel driving circuit.

Further, referring to FIG. 12, the second metal wiring structure ML2 may be further provided with an eighteenth bottom via hole region HA18. The eighteenth bottom via hole region HA18 is electrically connected to the fourth electrode plate CP4 through a via hole. Thus, the second electrode plate CP2 and the fourth electrode plate CP4 may be electrically connected through the second metal wiring structure ML2, such that the second electrode plate CP2 and the fourth electrode plate CP4 are connected to the second node N2 of the pixel driving circuit.

Optionally, referring to FIG. 12, the first metal wiring layer SD1 may also be provided with a third metal wiring structure ML3. An orthographic projection of the third metal wiring structure ML3 on the base substrate partially overlaps with the orthographic projection of the data lead DataL on the base substrate and an orthographic projection of the third conductive lead PL3 on the base substrate; In other words, the third metal wiring structure ML3 overlaps with the third conductive lead PL3 and the first metal wiring structure ML1. Referring to FIG. 12, the third metal wiring structure ML3 is provided with a fifth top via hole region HB5, a fourteenth top via hole region HB14, and a sixteenth bottom via hole region HA16. Referring to FIG. 13, the fifth top via hole region HB5 and the fifth bottom via hole region HA5 are directly connected through a via hole, such that the third metal wiring structure ML3 is connected to the first electrode of the driving transistor M3 through a via hole. The fourteenth top via hole region HB14 and the fourteenth bottom via hole region HA14 are directly connected through a via hole, such that the third metal wiring structure ML3 is connected to the first metal wiring structure ML1 through a via hole. The sixteenth bottom via hole region HA16 is electrically connected to the first power supply voltage lead VDDL through a via hole, such that the first power supply voltage VDD loaded on the first power supply voltage lead VDDL is loaded to the first metal wiring structure ML1, the power distribution lead VDDGL and the first electrode of the driving transistor M3 through the third metal wiring structure ML3.

Optionally, referring to FIG. 12, the first metal wiring layer SD1 may also be provided with a fourth metal wiring structure ML4, and the fourth metal wiring structure ML4 is provided with a first top via hole region HB1 and a fifteenth bottom via hole region HA15. Referring to FIG. 13, the first top via hole region HB1 and the first bottom via hole region HA1 are directly connected through a via hole, and the fifteenth bottom via hole region HA15 is electrically connected to the data lead DataL through a via hole, such that the data loaded on the data lead DataL is loaded to the first electrode of the first transistor M1 through the fourth metal wiring structure ML4. Further, the fourth metal wiring structure ML4 is located on a side of the third metal wiring structure ML3 in the second column direction H22.

Optionally, referring to FIG. 12, the first metal wiring layer SD1 may also be provided with a fifth metal wiring structure ML5. The fifth metal wiring structure ML5 overlaps with the tenth bottom via hole region HA10 and the eleventh bottom via hole region HA11 and is connected to the third electrode plate CP3. The fifth metal wiring structure ML5 is provided with the tenth top via hole region HB10 and the eleventh top via hole region HB11. Referring to FIG. 13, the tenth top via hole region HB10 and the tenth bottom via hole region HA10 are directly connected through a via hole, such that the fifth metal wiring structure ML5 and the second electrode of the fourth transistor M4 are connected through a via hole. The eleventh top via hole region HB11 and the eleventh bottom via hole region HA11 are directly connected through a via hole, such that the fifth metal wiring structure ML5 and the second electrode of the second transistor M2 are connected through a via hole. Thus, the second electrode of the fourth transistor M4 and the second electrode of the second transistor M2 are electrically connected to the third electrode plate CP3 and the first electrode plate CP1 through the fifth metal wiring structure ML5, such that the second electrode of the fourth transistor M4 and the second electrode of the second transistor M2 are connected to the first node N1 of the pixel driving circuit through the fifth metal wiring structure ML5. Further, the fifth metal wiring structure ML5 extends along the column direction H2 as a whole, and the third metal wiring structure ML3 and the fourth metal wiring structure ML4 are located on a side of the fifth metal wiring structure ML5 in the second row direction H12.

Figure 14:
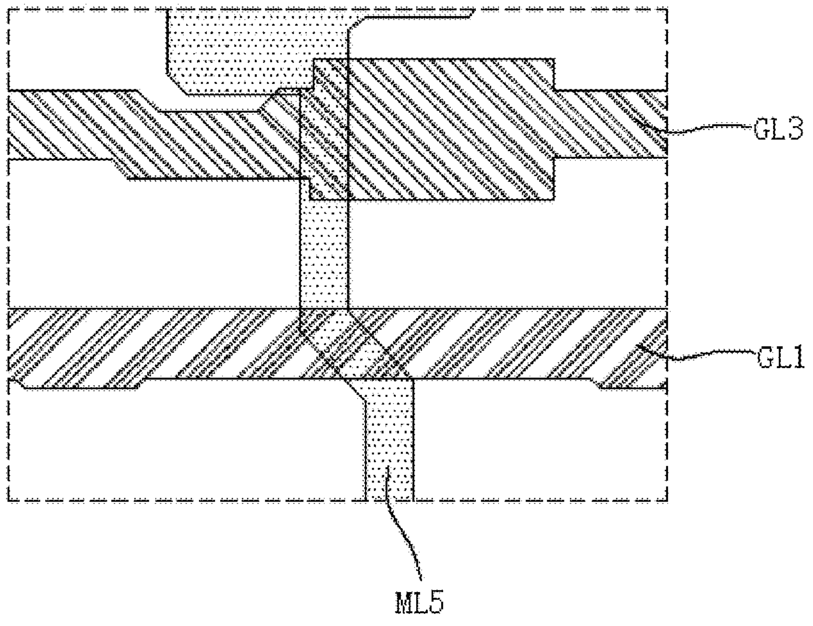
FIG. 14 is a partial structural view of a first scan lead, a third scan lead and a fifth metal wiring structure of a display panel according to an embodiment of the present disclosure.

Optionally, referring to FIG. 14, the first scan lead GL1 overlaps with the fifth metal wiring structure ML5, that is, an orthographic projection of the first scan lead GL1 on the base substrate F100 at least partially overlaps with an orthographic projection of the fifth metal wiring structure ML5 on the base substrate F100. In this way, although the second scan signal Gate_N affects an electromotive force of the third electrode plate CP3 (the first node N1) through the coupling effect on the fifth metal wiring structure ML5, the first scan signal Gate_P loaded on the first scan lead GL1 may exert an opposite coupling effect on the fifth metal wiring structure ML5. In this way, the second scan signal Gate_N and the first scan signal Gate_P counteracts the influence of the coupling effect on the electromotive force of the first node N1, so as to improve the accuracy of the electromotive force at the first node N1, especially improve the display accuracy of the pixel driving circuit under a low grayscale image. For example, the display panel may be provided with a second scan lead GL2 or a third scan lead GL3 that are configured to load the second scan signal Gate_N, and the second scan lead GL2 or the third scan lead GL3 overlaps with the fifth metal wiring structure ML5, and the first scan lead GL1 configured to load the first scan signal Gate_P overlaps with the fifth metal wiring structure ML5.

Figure 15:
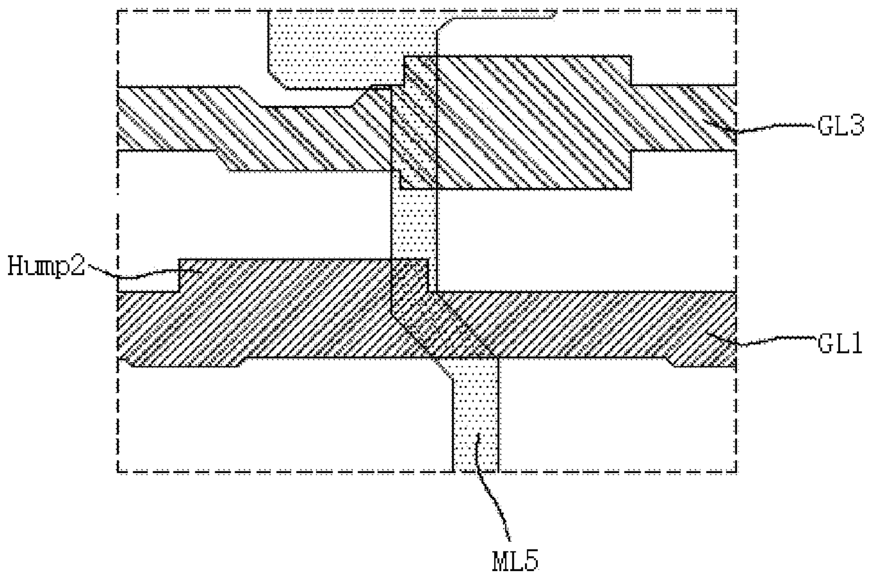
FIG. 15 is a partial structural view of a first scan lead, a third scan lead and a fifth metal wiring structure of a display panel according to an embodiment of the present disclosure.

It may be understood that a magnitude of the coupling capacitance, formed by the overlapping of the first scan lead GL1 and the fifth metal wiring structure ML5, is based on the ability of counteracting or counteracting the coupling effect of the second scan signal Gate_N on the fifth metal wiring structure ML5 as much as possible. In an embodiment of the present disclosure, referring to FIG. 15, the first scan lead GL1 may be provided with the second protruding portion Hump2, and an orthographic projection of the second protruding portion Hump2 on the base substrate F100 at least partially overlaps with an orthographic projection of the fifth metal wiring structure ML5 on the base substrate F100. In other words, a part or all of the second protruding portion Hump2 may overlap with the fifth metal wiring structure ML5, so as to increase an overlapping area between the first scan lead GL1 and the fifth metal wiring structure ML5 and improve the coupling effect of the first scan lead GL1 on the fifth metal wiring structure ML5. Further, the second protruding portion Hump2 may be located on a side of the first scan lead GL1 in the second column direction H22.

In an embodiment of the present disclosure, at least a part of a region where the first scan lead GL1 overlaps with the fifth metal wiring structure ML5 may not overlap with the power distribution lead VDDGL to overcome the shielding effect of the power distribution lead VDDGL on the first scan lead GL1.

In an embodiment of the present disclosure, the fifth metal wiring structure ML5 may be partially bent to avoid the twelfth bottom via hole region HA12.

Optionally, referring to FIG. 12, the first metal wiring layer SD1 may also be provided with a sixth metal wiring structure ML6. The sixth metal wiring structure ML6 overlaps with the fourth conductive lead PL4 and the twelfth bottom via hole region HA12, and is provided with a sixth top via hole region HB6 and a twelfth top via hole region HB12. Referring to FIG. 13, the sixth top via hole region HB6 and the sixth bottom via hole region HA6 are directly connected through a via hole, such that the sixth metal wiring structure ML6 is connected to the fourth conductive lead PL4 through a via hole. The twelfth top via hole region HB12 and the twelfth bottom via hole region HA12 are directly connected through a via hole, such that the sixth metal wiring structure ML6 is connected to the first electrode of the second transistor M2 through a via hole. In this way, the first electrode of the second transistor M2 is connected to the second electrode of the driving transistor M3 through the sixth metal wiring structure ML6, such that the sixth metal wiring structure ML6 may serve as a part of the third node N3 of the pixel driving circuit. Further, the sixth metal wiring structure ML6 is located on a side of the fifth metal wiring structure ML5 in the first row direction H11.

Optionally, referring to FIG. 12, the first metal wiring layer SD1 may also be provided with a seventh metal wiring structure ML7, and the seventh metal wiring structure ML7 overlaps with the seventh bottom via hole region HA7 and is provided with a seventh top via hole region HB7 and a nineteenth bottom via hole region HA19. Referring to FIG. 13, the seventh top via hole region HB7 and the seventh bottom via hole region HA7 are directly connected through a via hole such that the seventh metal wiring structure ML7 is electrically connected to the second electrode of the seventh transistor M7. The nineteenth bottom via hole region HA19 is configured to be connected to the light emitting element 170 through a via hole. Further, the seventh metal wiring structure ML7 is located between the third electrode plate CP3 and the reference voltage lead VRL and extends along the row direction H1.

Figure 16:
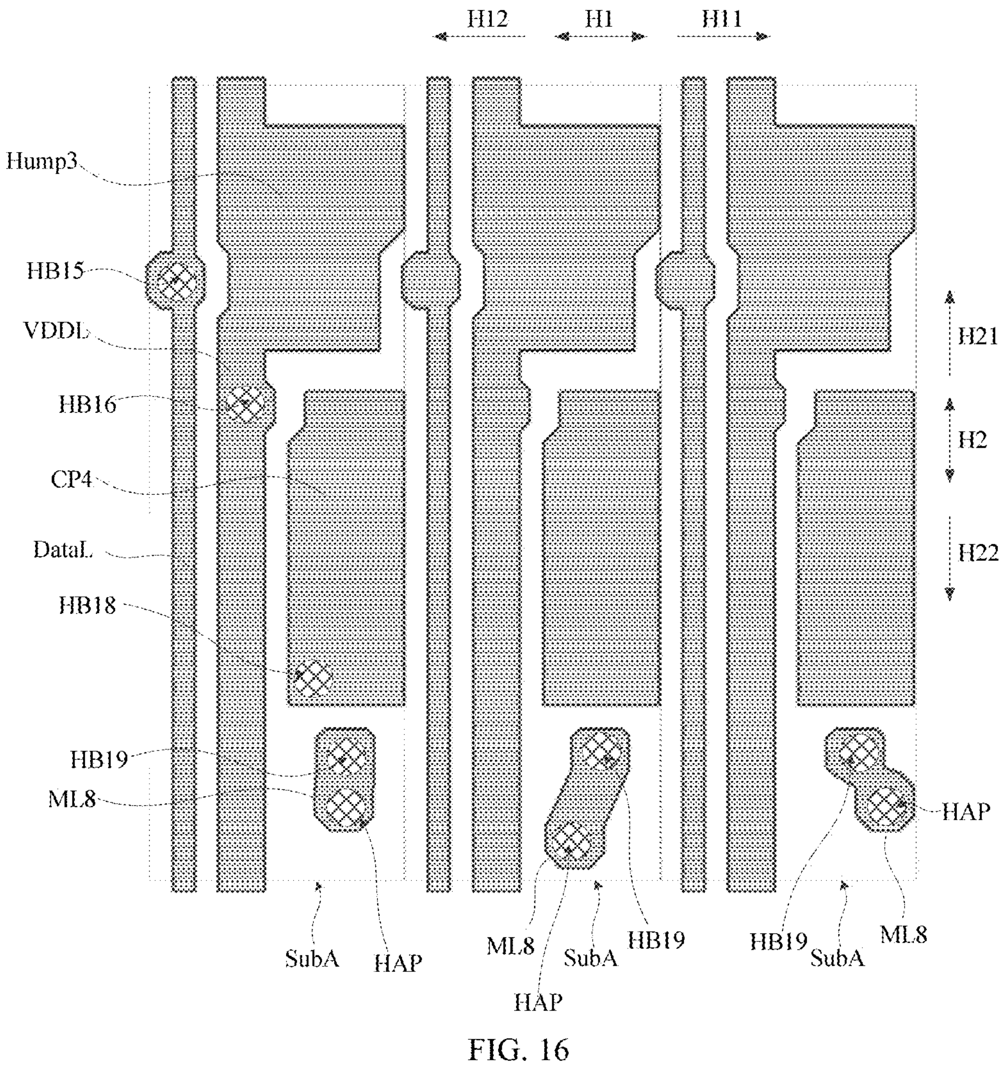
FIG. 16 is a structural view of a second metal wiring layer of a display panel according to an embodiment of the present disclosure.

Referring to FIG. 16, the second metal wiring layer SD2 may be provided with a data lead DataL and a first power supply voltage lead VDDL extending along the column direction H2, and may be provided with a fourth electrode plate CP4. In an embodiment of the present disclosure, the data lead DataL, the first power supply voltage lead VDDL, and the fourth electrode plate CP4 are sequentially arranged along the first row direction H11.

Optionally, referring to FIG. 16, the data lead DataL is provided with a fifteenth top via hole region HB15. Referring to FIG. 17, the fifteenth top via hole region HB15 and the fifteenth bottom via hole region HA15 are directly connected through a via hole. In this way, the data lead DataL is electrically connected to the first electrode of the first transistor M1 through the fourth metal wiring structure ML4.

Optionally, referring to FIG. 16, the first power supply voltage lead VDDL is provided with a sixteenth top via hole region HB16. Referring to FIG. 17, the sixteenth top via hole region HB16 and the sixteenth bottom via hole region HA16 are directly connected through a via hole. In this way, the first power supply voltage lead VDDL distributes the first power supply voltage VDD to the first metal wiring structure ML1 and the power supply distribution lead VDDGL through the third metal wiring structure ML3.

Optionally, referring to FIG. 16, the first power supply voltage lead VDDL is provided with a third protruding portion Hump3. An orthographic projection of the third protruding portion Hump3 on the base substrate F100 covers an orthographic projection of the channel region M2Act of the second transistor M2 on the base substrate F100 and an orthographic projection of the channel region M4Act of the fourth transistor M4 on the base substrate F100. In other words, the third protruding portion Hump3 covers the channel region M2Act of the second transistor M2 and the channel region M4Act of the fourth transistor M4 to shield the interference of external light and electromagnetic signals to the second transistor M2 and the fourth transistor M4, especially to shield the light from irradiating the second transistor M2 and the fourth transistor M4 and then causing that the leakage currents of the second transistor M2 and the fourth transistor M4 increase in the turn-off state.

Optionally, referring to FIG. 16, the fourth electrode plate CP4 is provided with an eighteenth top via hole region HB18. Referring to FIG. 17, the eighteenth top via hole region HB18 and the eighteenth bottom via hole region HA18 are directly connected through a via hole. In this way, the fourth electrode plate CP4 is electrically connected to the second electrode plate CP2 through the second metal wiring structure ML2. Further, referring to FIG. 16, along the row direction H1, the eighteenth top via hole region HB18 is located on a side of the fourth electrode plate CP4 in the second row direction H12. Along the column direction H2, the eighteenth top via hole region HB18 is located on a side of the CP in the first column direction H21.

Figure 20:
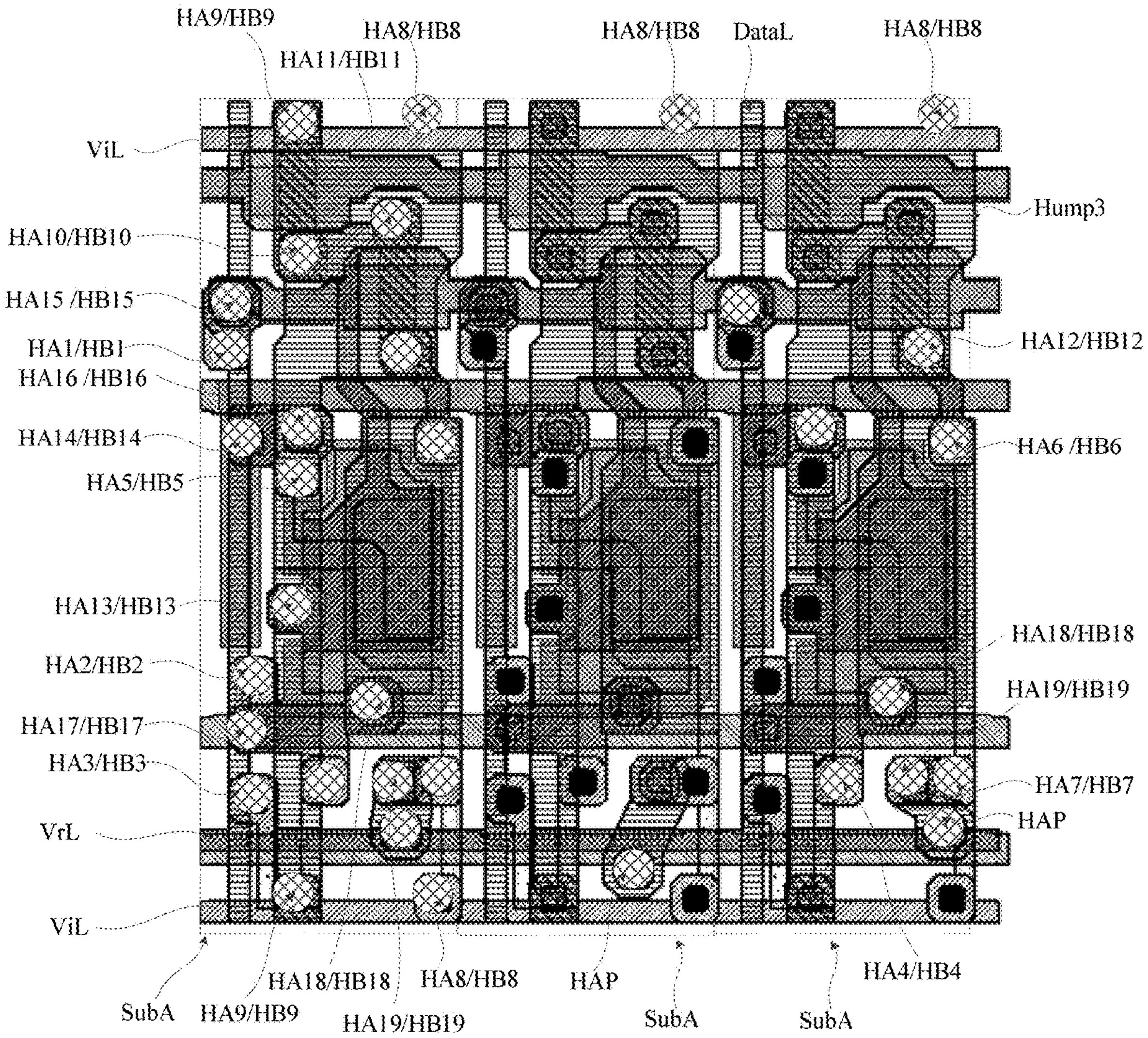
FIG. 20 is a schematic structural view of a polysilicon semiconductor layer, a first gate layer, a metal oxide semiconductor layer, a second gate layer, a first metal wiring layer, and a second metal wiring layer that are stacked, of a display panel according to an embodiment of the present disclosure.

Optionally, referring to FIG. 16, the second metal wiring layer SD2 may also be provided with an eighth metal wiring structure ML8. The eighth metal wiring structure ML8 at least partially overlaps with the seventh metal wiring structure ML7, and the eighth metal wiring structure ML8 is provided with the nineteenth top via hole region HB19 and a transfer via hole region HAP. Referring to FIGS. 17 and 20, the nineteenth top via hole region HB19 and the nineteenth bottom via hole region HA19 are directly connected through a via hole such that the eighth metal wiring structure ML8 is electrically connected to the second electrode of the seventh transistor M7 through the seventh metal wiring structure ML7. The transfer via hole region HAP is electrically connected to a pixel electrode of the light emitting element 170 through a via hole. In this way, the eighth metal wiring structure ML8 serves as a transfer metal structure of the pixel driving circuit. Further, the eighth metal wiring structure ML8 is located on a side of the first power supply voltage lead VDDL in the first row direction H11, and located on a side of the fourth electrode plate CP4 in the first column direction H21. It may be understood that a shape of the eighth metal wiring structure ML8 of each pixel driving circuit may be the same or may not be the same.

Optionally, the pixel layer F300 may be arranged on a side of the driving circuit layer F200 away from the base substrate F100, and may include a pixel electrode layer F310. The pixel electrode layer F310 may form a pixel electrode with a light emitting element, and each light emitting element may serve as a sub-pixel of the display panel of the present disclosure. The pixel electrode of the light emitting element may be connected to the transfer via hole region HAP through a via hole such that the second electrode of the seventh transistor M7 is electrically connected to the light emitting element 170. The light emitting element may be an OLED (organic electroluminescent diode), an LED (light emitting diode), a Mini LED (mini light emitting diode), a Micro LED (micro light emitting diode), an OLED-QD (organic electroluminescent diode-quantum dot), or other types of electroluminescent devices.

Figure 21:
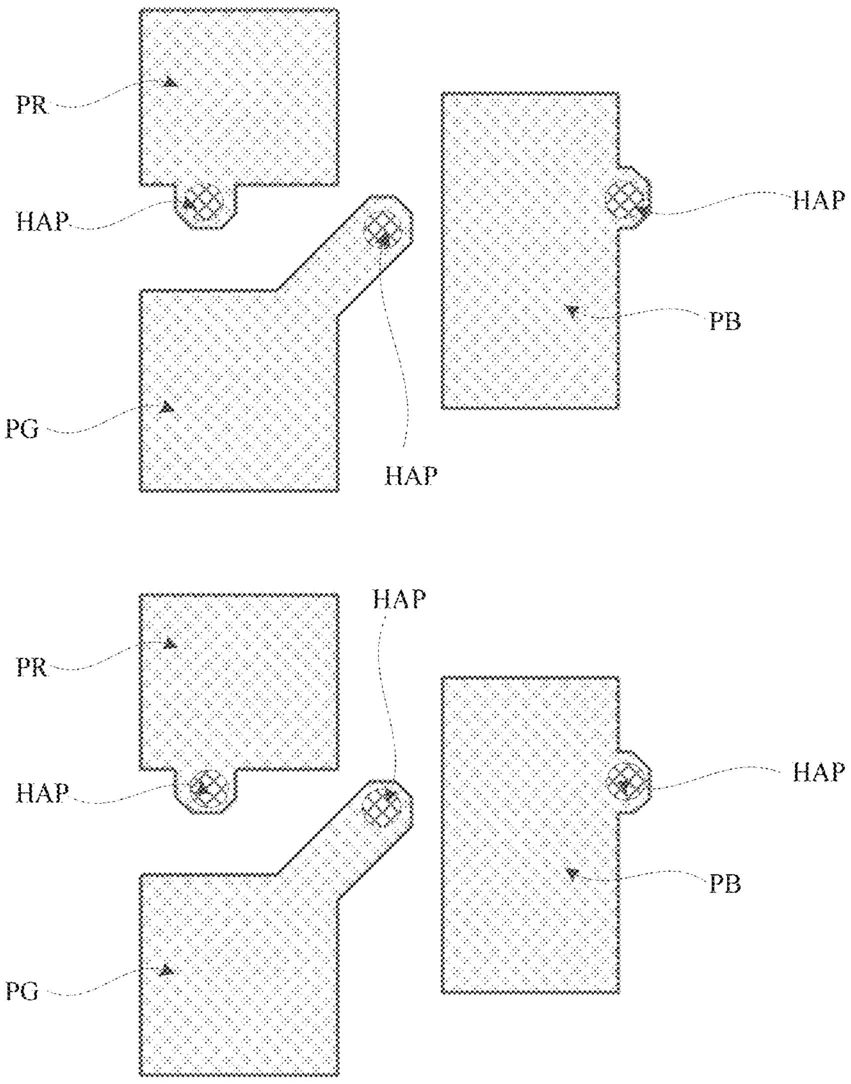
FIG. 21 is a schematic structural view of a pixel electrode layer of a display panel according to an embodiment of the present disclosure.
Figure 22:
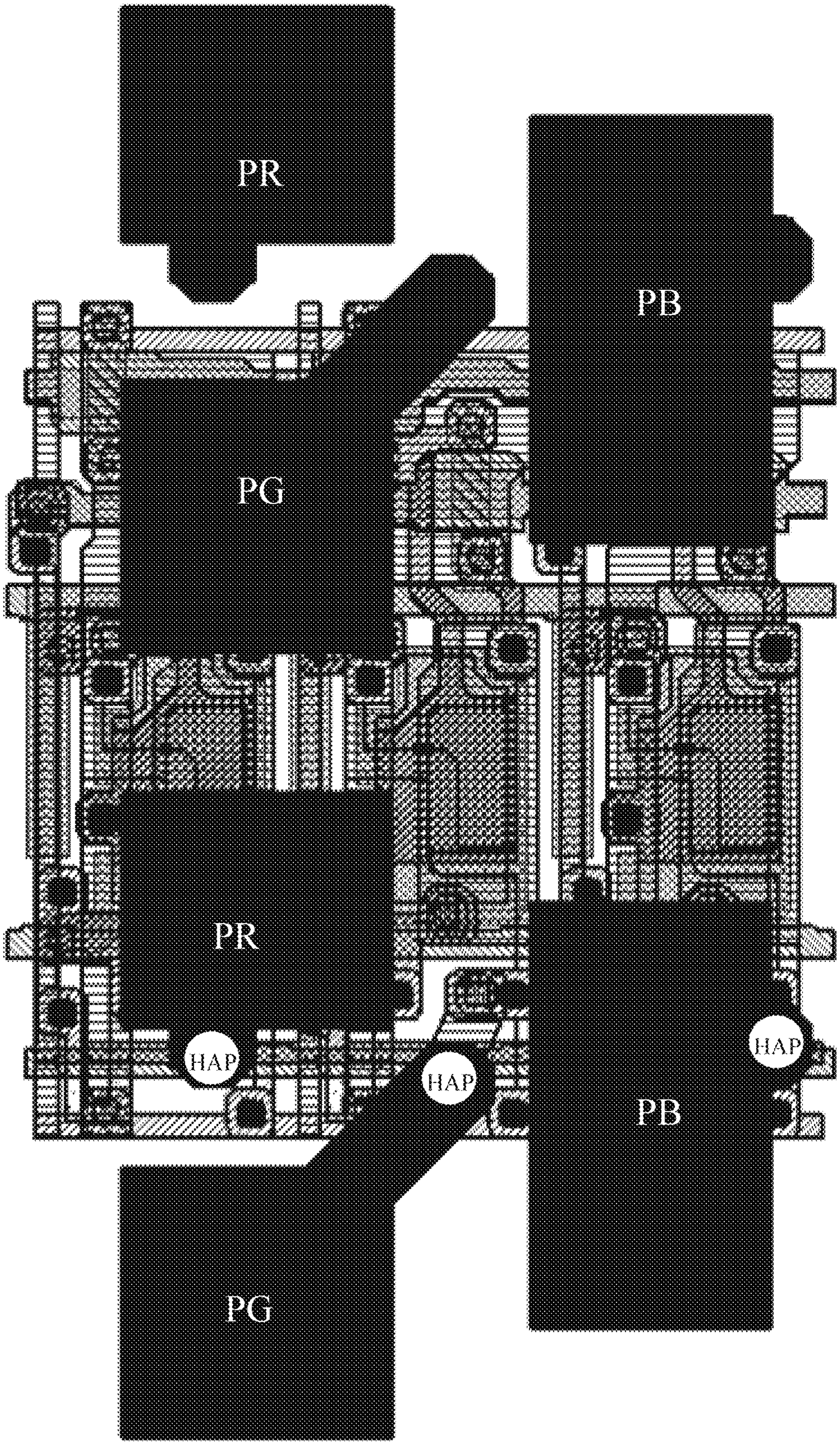
FIG. 22 is a schematic structural view of a polysilicon semiconductor layer, a first gate layer, a metal oxide semiconductor layer, a second gate layer, a first metal wiring layer, a second metal wiring layer, and a pixel electrode layer that are stacked, of a display panel according to an embodiment of the present disclosure.

In an embodiment of the present disclosure, the pixel layer includes a red light emitting element, a green light emitting element, and a blue light emitting element. Referring to FIGS. 21 and 22, the pixel electrode in the pixel electrode layer F310 may include a pixel electrode of red light emitting element PR, a pixel electrode of green light emitting element PG, and a pixel electrode of blue light emitting element PB. Each pixel electrode is connected to the transfer via hole region HAP of the corresponding pixel driving circuit.

Structure of the pixel layer F300 will be exemplarily described below by taking the light emitting element 170 as an OLED as an example. It may be understood that the structure of the pixel layer F300 may also be other structures, as long as the light emitting element 170 may be provided.

In this exemplary pixel layer F300, the pixel layer F300 includes a pixel electrode layer, a pixel definition layer, a support pillar layer, an organic light emitting function layer, and a common electrode layer that are sequentially stacked. The pixel electrode layer is provided with a plurality of pixel electrodes in a display region of the display panel; the pixel definition layer is provided with a plurality of run-through pixel openings arranged in one-to-one correspondence with the plurality of pixel electrodes in the display region, and any one of the pixel openings exposes at least a part of the corresponding pixel electrode. The support pillar layer includes a plurality of support pillars in the display region, and the support pillars are located on a surface of the pixel definition layer away from the base substrate, so as to support a fine metal mask (FMM) during the evaporation process. The organic light emitting function layer covers at least the pixel electrode exposed by the pixel definition layer. The organic light emitting function layer may include an organic electroluminescent material layer, and may include one or more of a hole injection layer, a hole transport layer, an electron barrier layer, a hole barrier layer, an electron transport layer, and an electron injection layer. Each film layer of the organic light emitting function layer may be prepared by an evaporation process, and a pattern of each film layer may be defined by using a fine metal mask or an open mask during the evaporation. The common electrode layer may cover the organic light emitting function layer in the display region. In this way, the pixel electrode, the common electrode layer, and the organic light emitting function layer located between the pixel electrode and the common electrode layer form an organic light emitting diode, and any one of the organic light emitting diodes may serve as a sub-pixel of the display panel.

In some embodiments, the pixel layer may further include a light extraction layer located on a side of the common electrode layer away from the base substrate to enhance a light emitting efficiency of the organic light emitting diode.

Optionally, referring to FIG. 23, the display panel may further include a thin film encapsulation layer F400. The thin film encapsulation layer is arranged on a surface of the pixel layer away from the base substrate, and may include an inorganic encapsulation layer and an organic encapsulation layer alternately stacked. The inorganic encapsulation layer may effectively block an external water and oxygen, and avoid the water and oxygen from invading the organic light emitting function layer and causing material degradation. Optionally, an edge of the inorganic encapsulation layer may be located at a peripheral region. The organic encapsulation layer is located between two adjacent inorganic encapsulation layers in order to achieve planarization and reduce stress between the inorganic encapsulation layers. An edge of the organic encapsulation layer may be located between the display region and the edge of the inorganic encapsulation layer. For example, the thin film encapsulation layer includes a first inorganic encapsulation layer, an organic encapsulation layer, and a second inorganic encapsulation layer that are sequentially stacked on a side of the pixel layer away from the base substrate.

Optionally, referring to FIG. 23, the display panel may further include a touch function layer F500, provided on a side of the thin film encapsulation layer away from the base substrate, and configured to achieve the touch operation of the display panel.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. A pixel driving circuit, comprising:

a driving transistor, connected to a first node and a third node;

a first transistor, connected to a second node, configured to output a data voltage to the second node in response to a first scan signal;

a second transistor, connected to the first node and the third node;

a fifth transistor, connected to the second node, configured to output a reference voltage to the second node in response to a first reset signal;

a seventh transistor, connected to the third node and a fourth node, configured to electrically communicate the third node with the fourth node in response to a light emitting control signal; and a storage capacitor, connected to the first node and the second node, wherein the storage capacitor is configured to store the data voltage and a threshold voltage of the driving transistor.

2. The pixel driving circuit according to claim 1, further comprising a fourth transistor, wherein a first electrode of the fourth transistor is configured to load an initialization voltage, and a second electrode of the fourth transistor is connected to the first node.

3. The pixel driving circuit according to claim 1, wherein a channel region of the fifth transistor comprises a first sub-channel region and a second sub-channel region, and a conductive second conductive lead connecting the first sub-channel region and the second sub-channel region in series; the first sub-channel region and the second sub-channel region are arranged in a row direction.

4. The pixel driving circuit according to claim 1, further comprising an eighth transistor, wherein a first electrode of the eighth transistor is configured to load an initialization voltage, and a second electrode of the eighth transistor is connected to the fourth node.

5. The pixel driving circuit according to claim 4, wherein a display panel is provided with a first reset lead;

wherein the first reset lead overlaps with a channel region of the eighth transistor, such that an overlapping part is reused as a gate of the eighth transistor.

6. The pixel driving circuit according to claim 4, wherein materials of active layers of the first transistor, the driving transistor, the fifth transistor, the seventh transistor, and the eighth transistor are all polysilicon semiconductor materials.

7. The pixel driving circuit according to claim 1, wherein the storage capacitor comprises a first electrode plate and a second electrode plate, the first electrode plate is located in a first gate layer of a display panel, and the second electrode plate is located in a second gate layer of the display panel;

wherein the second electrode plates adjacently arranged along a row direction are independently provided.

8. The pixel driving circuit according to claim 7, wherein the display panel is provided with a second gate layer, the second gate layer is provided with a power distribution lead extending along the row direction, and the power distribution lead is electrically connected to at least one first power supply voltage lead of the display panel.

9. The pixel driving circuit according to claim 1, wherein the display panel is provided with a second metal wiring layer, the second metal wiring layer is provided with a first power supply voltage lead, a data lead, and a transfer metal structure, and a pixel electrode of a light-emitting element is connected to the transfer metal structure through a via hole.

10. The pixel driving circuit according to claim 1, wherein the display panel comprises a base substrate, a driving circuit layer, and a pixel layer sequentially stacked;

wherein the pixel driving circuit is provided in the driving circuit layer;

the pixel layer comprises a red light emitting element, a green light emitting element, and a blue light emitting element; and a pixel electrode of a light-emitting element is electrically connected to the pixel driving circuit.

11. The pixel driving circuit according to claim 1, wherein during a threshold voltage compensation phase, the first node is charged to VDD+Vth; wherein the VDD is a first power supply voltage, and the Vth is the threshold voltage of the driving transistor.

12. The pixel driving circuit according to claim 7, wherein the pixel driving circuit is applied to a display panel, and the display panel comprises a base substrate;

wherein the storage capacitor further comprises a third electrode plate and a fourth electrode plate, and the first electrode plate, the second electrode plate, the third electrode plate and the fourth electrode plate are sequentially stacked on a side of the base substrate;

the display panel further comprises a first passivation layer and a first planarization layer sequentially stacked on a side of the third electrode plate away from the base substrate, and the fourth electrode plate is arranged on a side of the first planarization layer away from the base substrate;

the first planarization layer comprises at least a first portion and a second portion, and the first portion of the first planarization layer is sandwiched between the third electrode plate and the fourth electrode plate; the second portion of the first planarization layer does not overlap with the third electrode plate and the fourth electrode plate; and a thickness of the first portion is less than a thickness of the second portion.

13. The pixel driving circuit according to claim 12, wherein the thickness of the first portion of the first planarization layer is 0 to expose the first passivation layer.

14. The pixel driving circuit according to claim 12, wherein the first planarization layer comprises a third portion sandwiched between the first portion and the second portion, an inner edge of the third portion is located within an overlapping region of the third electrode plate and the fourth electrode plate, and an outer edge of the third portion does not overlap with any one of the third electrode plate and the fourth electrode plate.

15. The pixel driving circuit according to claim 3, wherein the pixel driving circuit is applied to a display panel, and a display panel is provided with a first reset lead;

wherein the first reset lead overlaps with a channel region of the fifth transistor, such that an overlapping part is reused as a gate of the fifth transistor.

16. The pixel driving circuit according to claim 15, wherein orthographic projections of the first sub-channel region and the second sub-channel region on a base substrate of the display panel are located within an orthographic projection of the first reset lead on the base substrate.

17. The pixel driving circuit according to claim 7, wherein the first electrode plate covers a channel region of the driving transistor to be reused as a gate of the driving transistor.

18. The pixel driving circuit according to claim 12, wherein the first electrode plate is provided with a thirteenth bottom via hole region, and the thirteenth bottom via hole region is electrically connected to the third electrode plate through a via hole.

19. The pixel driving circuit according to claim 1, wherein the pixel driving circuit is applied to a display panel, and the display panel comprises a first gate layer;

a gate of the second transistor comprises a first gate located at the first gate layer, the first gate layer is provided with a second scan lead configured to load a second scan signal, and the second scan lead is electrically connected to the first gate of the second transistor, such that the second scan signal is loaded to the first gate of the second transistor.

20. A display panel comprising: a pixel driving circuit, and the pixel driving circuit comprises:

a driving transistor, connected to a first node and a third node;

a first transistor, connected to a second node, configured to output a data voltage to the second node in response to a first scan signal;

a second transistor, connected to the first node and the third node;

a fifth transistor, connected to the second node, configured to output a reference voltage to the second node in response to a first reset signal;

a seventh transistor, connected to the third node and a fourth node, configured to electrically communicate the third node with the fourth node in response to a light emitting control signal; and a storage capacitor, connected to the first node and the second node, wherein the storage capacitor is configured to store the data voltage and a threshold voltage of the driving transistor.

* * * * *